United States Patent [19]
Ohigashi et al.

[11] Patent Number: 5,266,976
[45] Date of Patent: Nov. 30, 1993

[54] APPARATUS FOR FORMING A COLOR IMAGE

[75] Inventors: Chiaki Ohigashi, Yokohama; Tatsuya Katano, Fujisawa; Hiraku Yamamoto, Chigasaki; Keiji Ueki, Zama; Hitoshi Kato, Chigasaki, all of Japan

[73] Assignee: Matushita Graphic Communication Systems, Tokyo, Japan

[21] Appl. No.: 607,452

[22] Filed: Oct. 31, 1990

[30] Foreign Application Priority Data

Nov. 20, 1989 [JP] Japan .................. 1-301752
Mar. 19, 1990 [JP] Japan .................. 2-68879

[51] Int. Cl.$^5$ .............................. G01D 15/06
[52] U.S. Cl. ......................... 346/157; 355/208
[58] Field of Search ........... 355/326, 327, 328, 203, 355/204, 208, 308, 309, 316; 346/157, 153.1, 155

[56] References Cited

U.S. PATENT DOCUMENTS

| | | | |
|---|---|---|---|
| 4,577,953 | 3/1986 | Narukawa | 355/208 |
| 4,903,067 | 2/1990 | Murayama et al. | 346/157 X |
| 4,965,597 | 10/1990 | Ohigashi et al. | 346/157 |
| 4,987,448 | 1/1991 | Chikama | 355/316 X |
| 5,025,269 | 6/1991 | Saeki et al. | 346/157 X |

Primary Examiner—A. T. Grimley
Assistant Examiner—Sandra L. Brase
Attorney, Agent, or Firm—Amster, Rothstein & Ebenstein

[57] ABSTRACT

A color image recording apparatus comprises edge detection device with image sensors for detecting longitudinal edges of electrostatic recording paper, and mark detection device for detecting registration marks formed at an equal pitch along the edges of the recording paper. Both edges are detected at a first pass thereof through the edge detection device, and the detected output is stored in a memory. During each of second and subsequent passes, detected data is compared with the initially stored data to correct for expansion and shrinkage of the recording paper. Oblique motion of the recording paper is detected from the timing difference between registration marks formed on opposite sides of the recording paper, which timing difference is used to change line recording timing. A single correction is periodically repeated and changed until completion of the correcting for oblique motion of the recording paper as well as expansion or shrinkage thereof, hence ensuring an exact positional coincidence of the individual color images.

15 Claims, 33 Drawing Sheets (a)

(b)

| | $D_{n-2}$ | $D_{n-1}$ | $D_n$ | $D_{n+1}$ | $D_{EX}$ |
|---|---|---|---|---|---|
| 1 | L | L | L | L | L |
| 2 | H | L | L | L | L |
| 3 | L | H | L | L | H |
| 4 | H | H | L | L | L |
| 5 | L | L | H | L | H |
| 6 | H | L | H | L | L |
| 7 | L | H | H | L | H |
| 8 | H | H | H | L | H |
| 9 | L | L | L | H | L |
| 10 | H | L | L | H | L |
| 11 | L | H | L | H | L |
| 12 | H | H | L | H | H |
| 13 | L | L | H | H | L |
| 14 | H | L | H | H | H |
| 15 | L | H | H | H | H |
| 16 | H | H | H | H | H |

| $D_{n-4}$ | $D_{n-3}$ | $D_{n-2}$ | $D_{n-1}$ | $D_n$ | $D_{n+1}$ | $D_{n+2}$ |
|---|---|---|---|---|---|---|
| $D_{n-4}$ | $D_{n-3}$ | $D_{n-2}$ | $D_{SH}$ | $D_{n+1}$ | $D_{n+2}$ | $D_{n+3}$ |

(b)

|    | $D_{n-2}$ | $D_{n-1}$ | $D_n$ | $D_{n+1}$ | $D_{SH}$ |
|----|-----------|-----------|-------|-----------|----------|
| 1  | L | L | L | L | L |
| 2  | L | H | L | L | H |
| 3  | L | L | H | L | H |
| 4  | L | H | H | L | H |
| 5  | H | L | L | L | L |
| 6  | H | H | L | L | H |
| 7  | H | L | H | L | H |
| 8  | H | H | H | L | H |
| 9  | L | L | L | H | L |
| 10 | L | H | L | H | H |
| 11 | L | L | H | H | H |
| 12 | L | H | H | H | H |
| 13 | H | L | L | H | L |
| 14 | H | H | L | H | L |
| 15 | H | L | H | H | L |
| 16 | H | H | H | H | H |

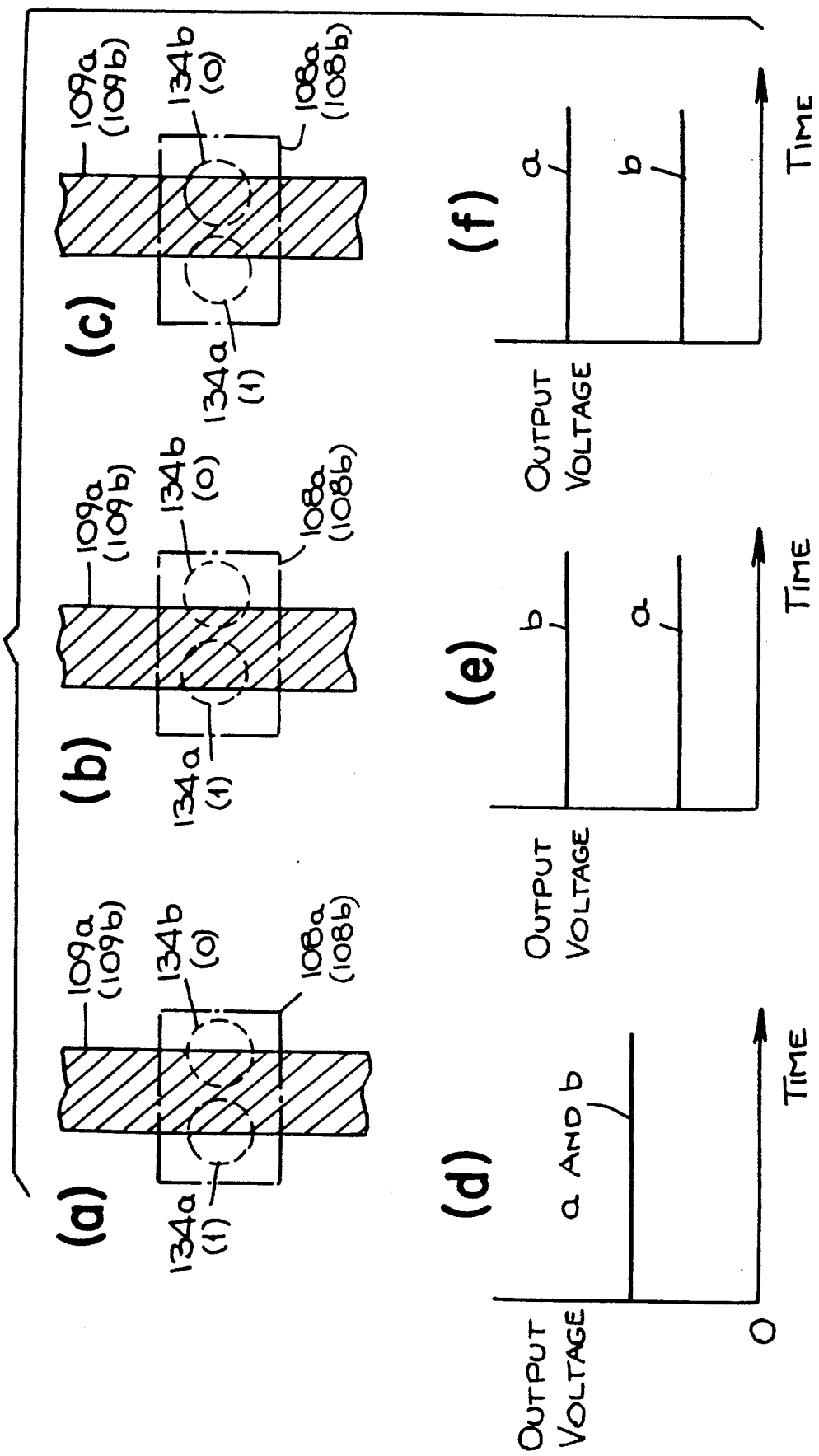

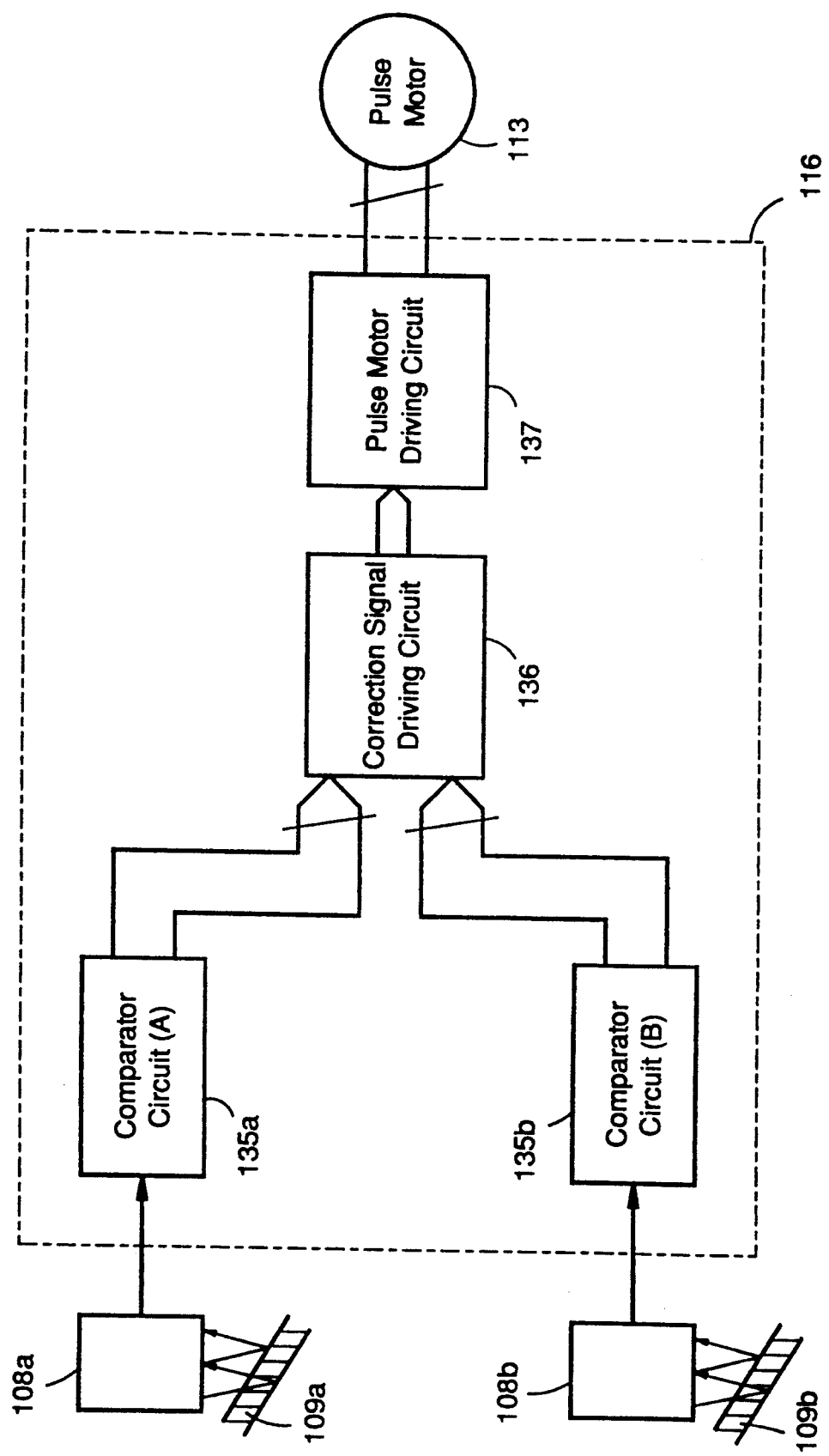

APPARATUS FOR FORMING A COLOR IMAGE

BACKGROUND OF THE INVENTION

A. Field of the Invention

The present invention relates to a color image recording apparatus capable of forming a color image by repeating reciprocative transport of a recording medium with respect to a recording mechanism.

B. Description of the Prior Art

A known conventional color image recording apparatus is illustrated in FIGS. 28 through 39. Referring to FIG. 28, recording mechanism 101 comprises an electrostatic recording head 102, a driving circuit 114 connected thereto, and liquid developing devices 103a, 103b, 103c and 103d which are supplied black, cyan, magenta and yellow liquid developing agents, respectively. Each of the developing devices 103a, 103b, 103c, and 103d can be moved into and out of its respective developing position. Electrostatic recording paper 104 is provided with tracking lines 109a, 109b parallel to the edges of the recording paper 104, and registration marks 110a, 110b. Tracking lines 109a, 109b and registration marks 110a, 110b are shown in FIG. 28 on the upper surface of paper 104 for convenience, but would normally be provided on the lower surface of paper 104. Transport rollers 105, 106 serve to transport the electrostatic recording paper 104 in the either the forward or reverse direction, indicated by arrows D and E, respectively. A pinch roller 107 is provided above the recording head 102 for maintaining proper contact of the electrostatic recording paper 104 with the recording head 102. Between the first developing device 103a and the recording head 102, are line detectors 108a, 108b and mark detectors 111a, 111b which are disposed under the electrostatic recording paper 104 and fixed to the recording head 102 in such a manner to move together with the recording head 102. Line detectors 108a, 108b generate position signals of tracking lines 109a, 109b. Mark detectors 111a, 111b serve to detect passage of registration marks 110a, 110b. Recording-head positioning device 112 is equipped with pulse motors 113 and 117. Translation control circuit 116 controls pulse motor 113 to position the recording head 102 in the directions indicated by arrow F. Recording head control circuit 115 controls both the recording timing and the angle of the recording head 102.

Prior to recording an image using the first color, the electrostatic recording paper 104 is transported by the transport rollers 105, 106 in the direction of arrow D. Latent images corresponding to the tracking lines 109a, 109b and the registration marks 110a, 110b of a predetermined recording line pitch are recorded by the head 102 outside the effective area of the electrostatic recording paper 104. Thereafter such latent images are developed by the liquid developing device 103a supplied with a black liquid developing agent, so as to render visible the tracking lines 109a, 109b and the registration marks 110a, 110b. The electrostatic recording paper 104 with the tracking lines 109a, 109b and the registration marks 110a, 110b recorded completely thereon is then transported by the transport rollers 105, 106 in the direction of arrow E and is thereby returned to its former position.

The electrostatic recording paper 104 is then transported in the direction of an arrow D by the transport rollers 105, 106 again. At this time, the registration marks 110a, 110b are monitored by the mark detectors 111a, 111b respectively, constructed as shown in FIG. 29, such that light emitted from a light source 118 is converged by a lens 119 to illuminate the electrostatic recording paper 104. If the paper is positioned so that no registration mark 110a, 110b is currently under mark detector 111a, 111b, the light is reflected from the surface of the paper 104, and the reflected light is focused on the light sensitive surface of photosensor 121 through a lens 120. Alternatively, if one of the a registration marks 110a, 110b is under the mark detector 111a, 111b, the light emitted form light source 118 and reflected off the face of the paper 104 is reduced and photosensor 121 does not detect the reflection of light from the surface of paper 104.

As shown in FIG. 30, the photosensor 121 of mark detectors 111a, 111b comprises a light-receiving photo transistor 122, an operational amplifier 123 and a comparator 124. The output of the photo transistor 122 is amplified by the operational amplifier 123 to form a waveform as shown in FIG. 31. The output voltage of the operational amplifier 123 is converted by the comparator 124 into a binary signal shown in FIG. 32. As a result, the output signals of mark detectors 111a, 111b are high upon the detection of registration marks 110a, 110b and low when no registration marks are present.

When the mark detectors 111a, 111b first detect registration marks 110a, 110b along the longitudinal edges of the electrostatic recording paper 104, the recording head 102 begins to form a latent image corresponding to the black image. Alternatively, instead of starting the formation of the black latent image at the initial detection of the registration marks 110a, 110b, the latent image may be started after a predetermined time from the initial detection of the registration marks 110a, 111b. The outputs of the mark detectors 111a, 111b are fed to flip flops 125a, 125b respectively of a recording-head control circuit shown in FIG. 33. The outputs Q, of each of the flip-flops 125a, 125b alternately represent a mark interval (high level duration). The outputs Q, of the flip-flops 125a, 125b are connected to count enable inputs of counter circuits 126a, 126b, 126c, 126d to which output pulses from a pulse generator circuit 127 proportional to the length of motion of the electrostatic recording paper 104 are supplied as clock pulses. Accordingly the counter circuits 126a and 126b alternately measure the interval of the registration marks 110a, while the counter circuits 126c and 126d alternately measure the interval of the registration marks 110b. The results of such measurements are then fed to a divider circuit 128, and the counted values are compared with reference values (determined initially at the time of recording the registration marks 110a, 110b), whereby data for setting the next trigger generator circuit 129 is produced in such a manner that the distances between the registration marks 110a, 110b are always recorded with an equal number of lines (N lines in this example). On the basis of the data thus obtained, the trigger generator circuit 129 controls a driving circuit 114 in accordance with reference clock pulses 130, thereby generating a period during which an image is formed by the recording head 102.

Referring to FIG. 34, the operation described above will be described with reference to a timing chart with respect to registration marks 110a and mark detector 111a. The output of mark detector 111a is shown in FIG. 34(a). As in FIG. 32, a high signal indicates the presence of a registration mark 110a; a low signal indicates the absence of a registration mark. The outputs Q, of the flip flop 125a are shown in FIGS. 34(c) and 34(d) respectively. The counter circuits 126a and 126b function during the high level of the outputs Q, and count the reference pulses obtained from the pulse generator circuit 127. That is, the counter circuit 126a counts the reference pulses during the periods $t_1, t_3, t_5, \ldots$ between the odd numbered registration marks 110b, while the counter circuit 126b counts the reference pulses in the periods $t_2, t_4, t_6, \ldots$ between the even numbered registration marks 110b. The divider circuit 128 divides the periods $t_1, t_2, t_3, \ldots$ by the number of lines N to determine the distance between the registration marks 110b. The resultant values, $t_1/N, t_2/N, t_3/N, \ldots$, are output from the divider circuit 128 to the trigger generator circuit 129 after measuring the distance between each successive pair of registration marks 110b.

The trigger generator circuit 129 outputs trigger signals of period $t_n/N$ during the period of $t_{n+1}$. These signals of $t_1/N, t_2/N, t_3/N, \ldots t_{n-1}/N, t_n/N$ corresponding to the values obtained from the divider circuit 128, are shown in FIG. 34(b). The driving circuit 114 energizes the recording head 102 synchronously with such trigger signals, thereby forming a latent image on the electrostatic recording paper 104 every $t_n/N$ period.

Furthermore, when the registration marks 110a, 110b are detected by the mark detectors 111a, 111b, the positional difference between the corresponding registration marks 110a, 110b on opposite edges of paper 104 is detected by a difference detector circuit 131. In accordance with the difference thus detected, a motor control circuit 132 feeds a signal to pulse motor circuit 133 to operate pulse motor 117. Pulse motor 117 adjusts the rotational position of recording head 102 such that the mark detectors 111a, 111b, which are fixed to recording head 102, are positioned to detect registration marks 110a, 110b simultaneously.

Simultaneously with the detection of the registration marks 110a, 110b by the mark detectors 111a, 111b, the deviation of the tracking lines 109a, 109b from their reference positions are detected by the line detectors 108a, 108b, respectively, which are constructed as illustrated in FIG. 35. Each line detector 108a, 108b is comprised of two photosensors 134a, 134b and positioned so that the tracking lines 109a, 109b pass between the photosensors 134a, 134b. Light emitted from a light source 131 is converged on the electrostatic recording paper 104 by a lens 132. The light reflected from the face of paper 104 is focused onto the light sensitive surface of two photosensors 134a, 134b by a condenser lens 133. Each photosensor 134a, 134b comprises a photo transistor 135 and an operational amplifier 136 as shown in FIG. 36. The amount of light received by the photosensors 134a, 134b is converted into a voltage output. The output of each operational amplifier 136 changes in accordance with the amount of light reflected from the face of paper 104 as graphically shown in FIG. 37.

The translational positioning of the recording head 102 is accomplished as follows. FIG. 38(a) illustrates a state where the tracking line 109a or 109b is properly positioned with respect to the line detector 108a or 108b. In this state, the tracking line 109a is uniformly detected by the two photosensors 134a and 134b, so that the output voltages of both photosensors 134a, 134b are equal to each other as graphically shown in FIG. 38(d). If the tracking line 109a is deviated to the left as illustrated in FIG. 38(b), the amount of light received by the photosensor 134a is reduced while the amount of light received by photosensor 134b is increased; the output voltage of the photosensors 134a, 134b are correspondingly affected as shown graphically in FIG. 38(e). If the tracking line 109a is deviated to the right as illustrated in FIG. 38(c), the amount of light received by the photosensor 134a while the amount of light received by photosensor 134b is reduced; the output voltages of photosensors 134a, 134b are correspondingly affected as shown graphically in FIG. 38(f).

The output signals of the line detectors 108a, 108b are fed to comparator circuits 135a and 135b, respectively, of the translation controller 116 as shown in FIG. 39. The output voltages of the two photosensors 134a, 134b of each of the line detectors 108a, 108b are compared. In accordance with the result of such comparison, correction signal generator circuit 136 determines the correction to be made to the position of the recording head 102 and line detectors 108a, 108b fixed to the recording head 102, with respect to the electrostatic recording paper 104. A control signal is fed to a pulse motor driving circuit 137 to control pulse motor 113 for causing translational motion of the recording head 102 in such a manner as to maintain a balanced state in the output voltages of the photosensors 134a, 134b of the line detectors 108a, 108b as graphically shown in FIG. 38(d). As a result, the output voltages of the photosensors 134a, 134b in each of the line detectors 108a, 108b are placed in a balanced state, and the pulse motor 113 is brought to a halt upon detection of such state by the correction signal generator circuit 136 of the translational controller 116.

This operation is performed until the first color image, usually black, has been completed. The paper 104 is then moved by the transport rollers 105, 106 back again in the direction of arrow E (FIG. 28) until it reaches its initial position. On subsequent passes of the paper 104 through the apparatus, the registration marks 110a, 110b and the tracking lines 109a, 109b are detected in the same manner to superimpose the latent images of the other colors on the previously formed image. The operation is repeated for cyan, magenta, and yellow until the complete color image has been formed.

One disadvantage of the known apparatus just described is that the tracking lines 109a, 109b and registration marks 110a, 110b require a substantial portion of the paper 104. The edges of the paper 104 which are used by the tracking lines 109a, 109b and registration marks 110a, 110b are not available for image recording. Another disadvantage of the apparatus described is that the positioning of the paper 104 in the transport direction is controlled by first measuring the distance between the registration marks and then determining the recording timing on the basis of such measured information. Any error induced during the transport of the paper 104, such as slippage of the transport roller or the like, is corrected on the basis of the deviation in the recorded image formed thereafter, hence causing a positional color discrepancy when many colors are superimposed upon one another. In addition, the process of positioning the recording head perpendicular to the transport direction of the paper 104 by monitoring the tracking lines 109a, 109b is subject to inaccuracies due to non-uniformity of the tracking lines. The mechanism may attempt to correct the position of the recording head 102 in response to a non-uniformity sensed by the photosensors 134a, 134b even thought the position of paper 104 is unchanged. Finally, the mechanism required for effecting translational and rotational motion of the recording head 102 is complex leading to a likelihood of failure.

II. OBJECTS AND SUMMARY OF THE INVENTION

An object of the present invention is to provide a color image recording apparatus which detects any meandering, shifting, or shrinkage or expansion of the electrostatic recording paper on which the image is being recorded and corrects for such meandering, shifting, or shrinkage or expansion so as to insure accurate superimposition of colors to create a proper image.

Another object of the present invention is to provide a color image recording apparatus which insures accurate superimposition of colors without utilizing a complex mechanism to move the recording head.

Another object of the present invention is to provide a color image recording apparatus which insures superimposition of colors without utilizing substantial portions of the electrostatic recording paper for registration marks and tracking lines.

Another object of the present invention is to provide a color image recording apparatus which duplicates a color image with improved quality. More specifically, an object of this invention is to provide an improved apparatus which utilizes an image positioning index outside the effective area of a recording medium, and a process for detecting such index by a photoelectric sensor.

In accordance with an aspect of the present invention, an edge detection means detects the longitudinal edges of electrostatic recording paper and mark detection means detects registration marks formed along the edge of the paper. The edges of the paper are periodically detected during the initial transport of the paper through the apparatus by the edge detection means and the edge output data produced by the edge detection means is stored in a memory. At each of the subsequent passes of the paper through the apparatus, the edge output data is compared with the data stored during the first pass for correction of the position of the paper.

In addition, means are provided for calculating the recording paper transport speed by measuring the distance between adjacent registration marks. The difference between the detected distances between adjacent registration marks during recording and the distance between adjacent registration marks during initial recording of the registration marks is determined and used when forming images of individual colors to correct for changes in the position of the recording paper.

Another feature of the invention resides in that any oblique motion of the recording paper is detected by detecting the timing difference in detection of corresponding registration marks provided along the opposite longitudinal edges of the recording paper, whereby the line recording timing can be corrected.

More specifically, according to the present invention, the two edges of the recording paper detected at the first pass thereof by the edge detection means are stored periodically in a memory, and the edge data obtained during the second and subsequent passes of the recording paper is compared with the stored edge data, thereby detecting any meandering motion of the electrostatic recording paper as well as any expansion, shrinkage or oblique motion of the paper. This enables a single correction to be periodically executed until the meandering and oblique motion of the electrostatic recording paper as well as expansion and shrinkage thereof is completely corrected, hence ensuring an exact positional coincidence of individual colors despite existence of any flaw or stain on the recording paper.

In addition, transport speed of the electrostatic recording paper is corrected by measuring the distance between adjacent registration marks by the detection means by calculating the difference between the number of image lines recorded between adjacent registration marks during the recording of one color image with the number of image lines between those adjacent registration marks preset initially at the time of recording the registration marks. The paper transport speed is controlled based upon that comparison such that the next inter-registration mark distance is recorded with the number of image lines including the calculated difference added thereto, so that it becomes possible to avert accumulation of errors derived from any errors in paper transport.

The above and other objects and features of the present invention will be apparent from the following description which will be given with reference to the illustrative accompanying drawings.

III. BRIEF DESCRIPTION OF THE DRAWINGS

Figure 8:
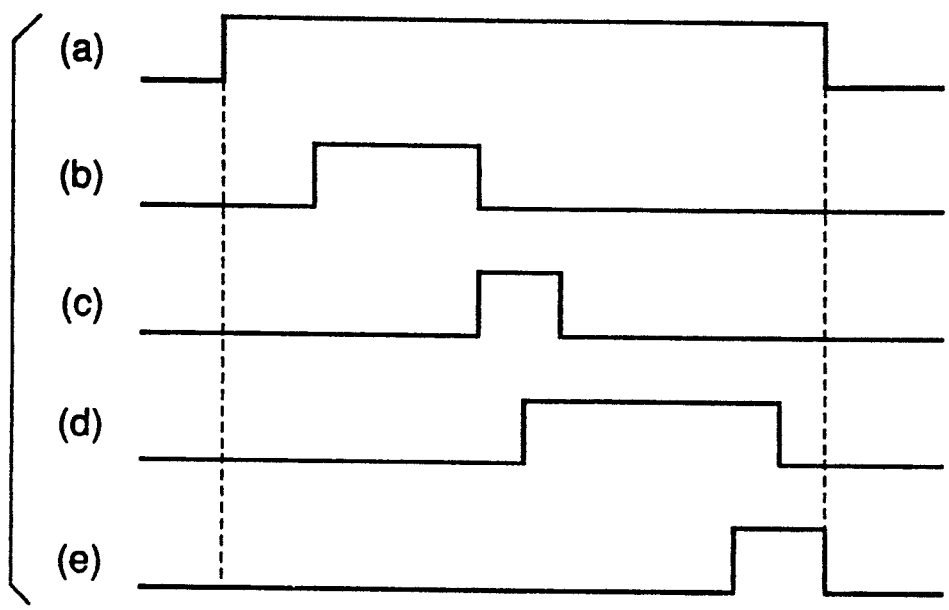
Figure 9:
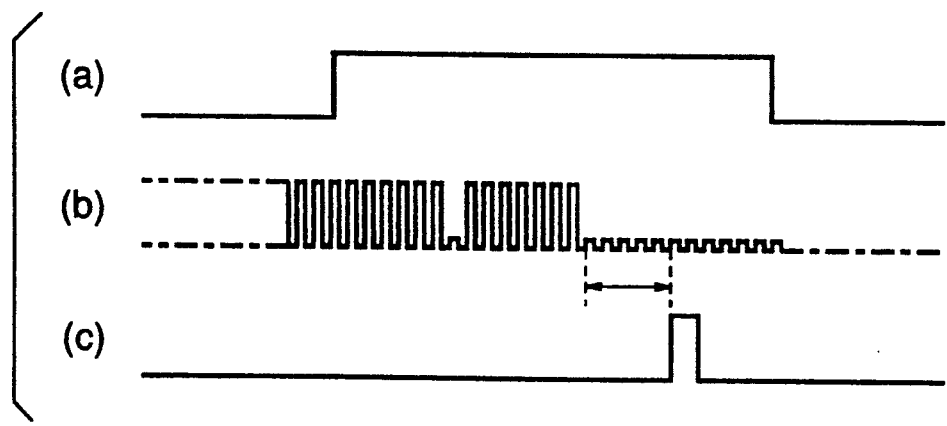
Figure 10:
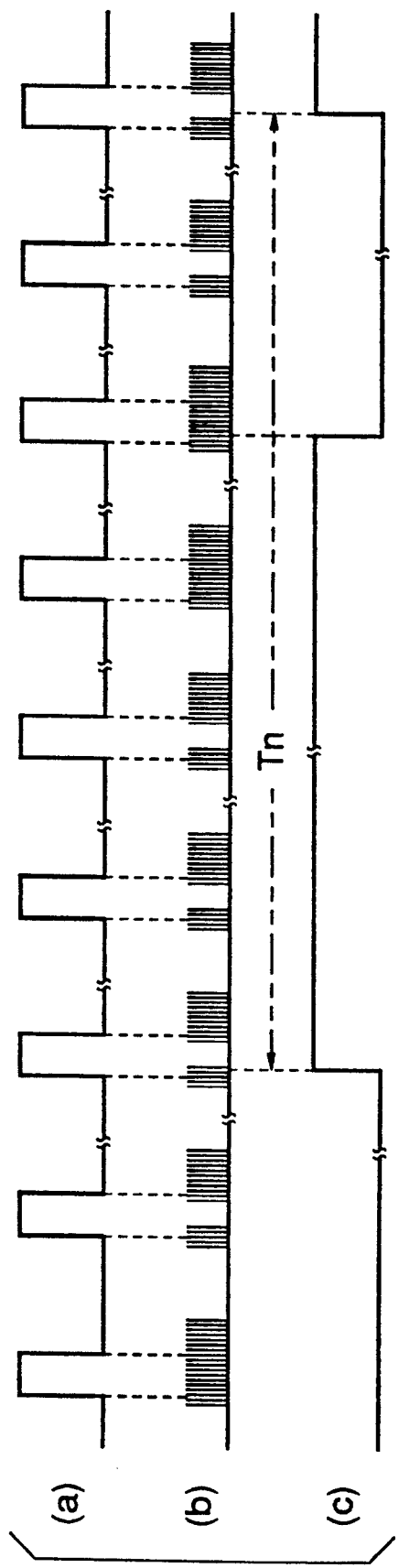
Figure 11:
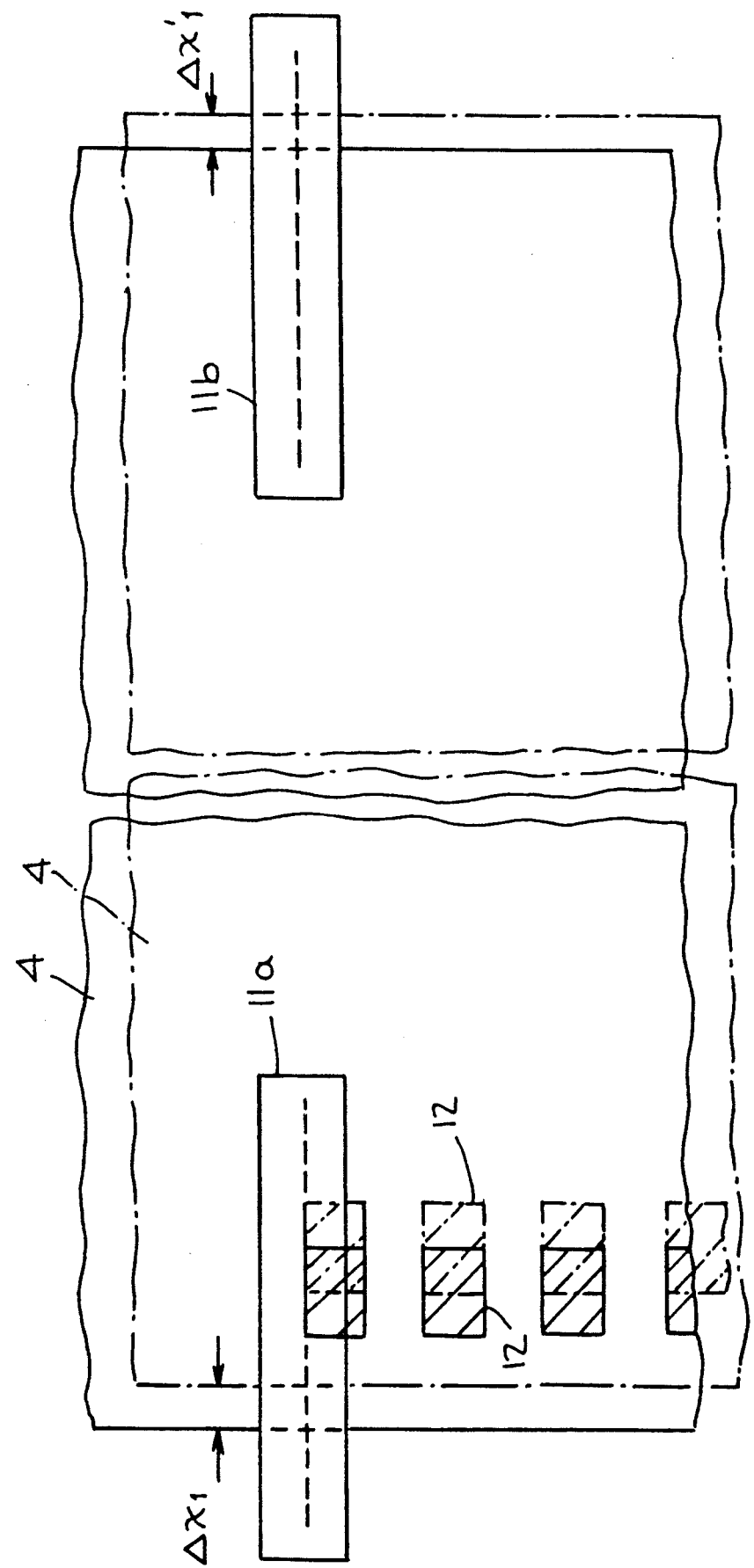
Figure 12:
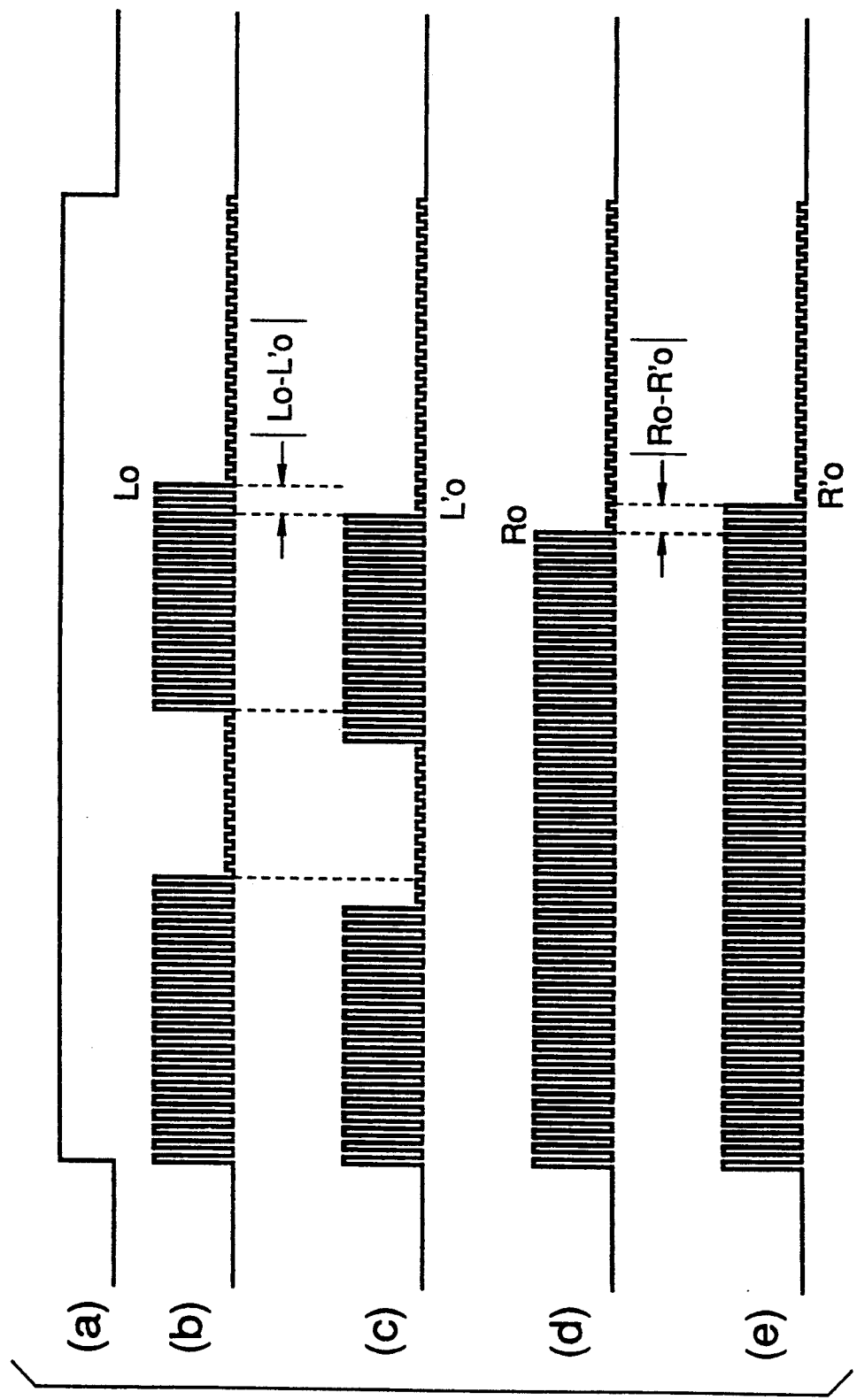
Figure 13:
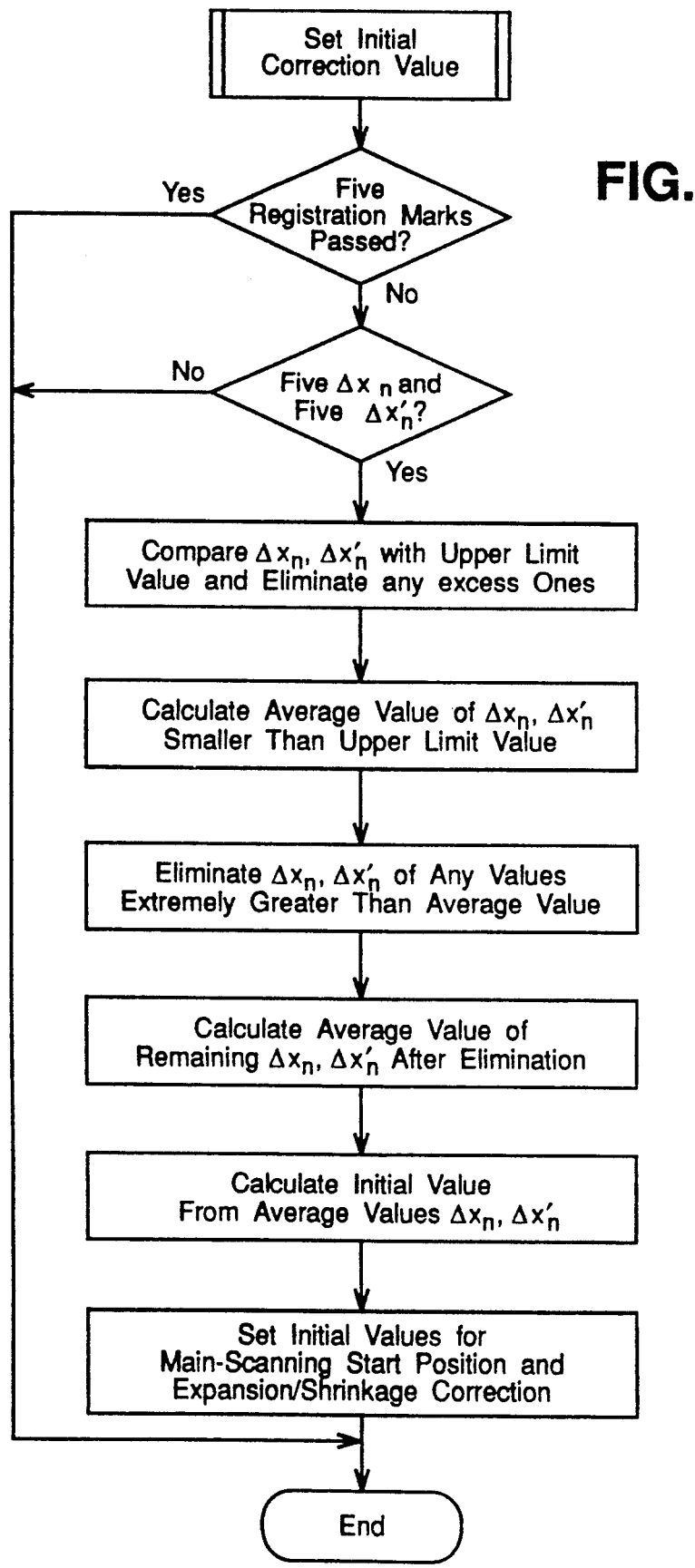
Figure 14:
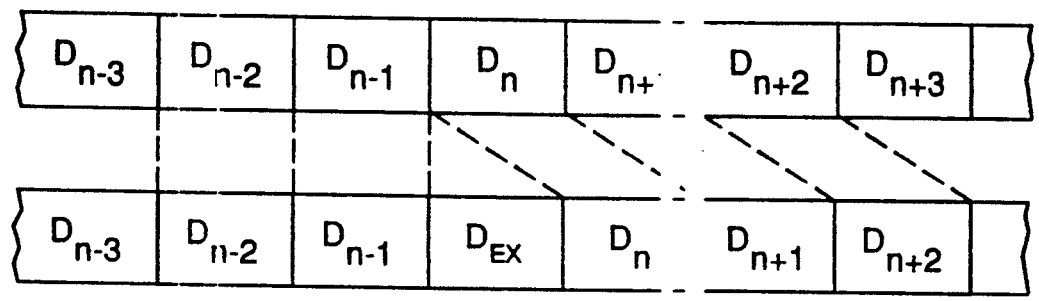
Figure 16:
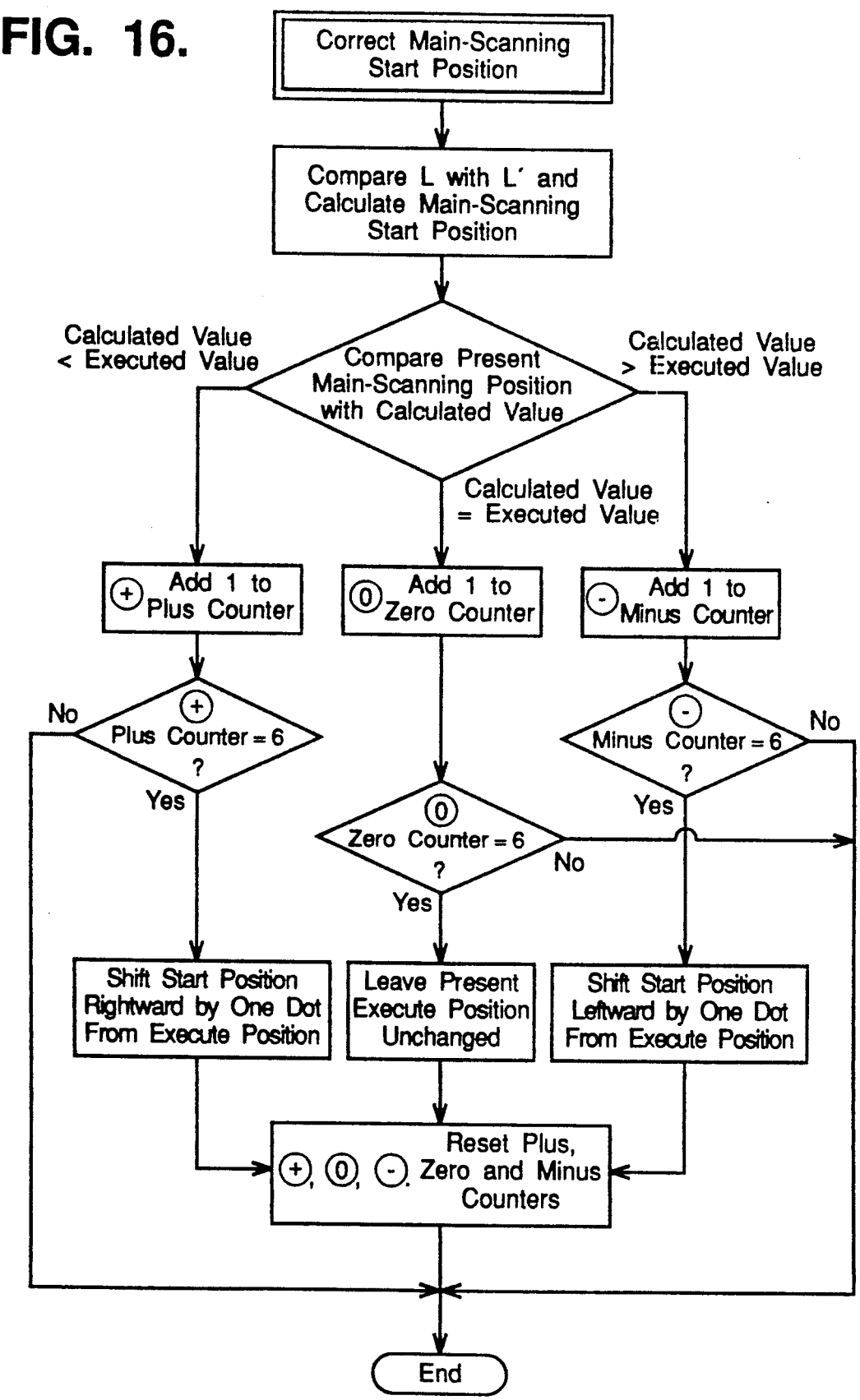
Figure 17:
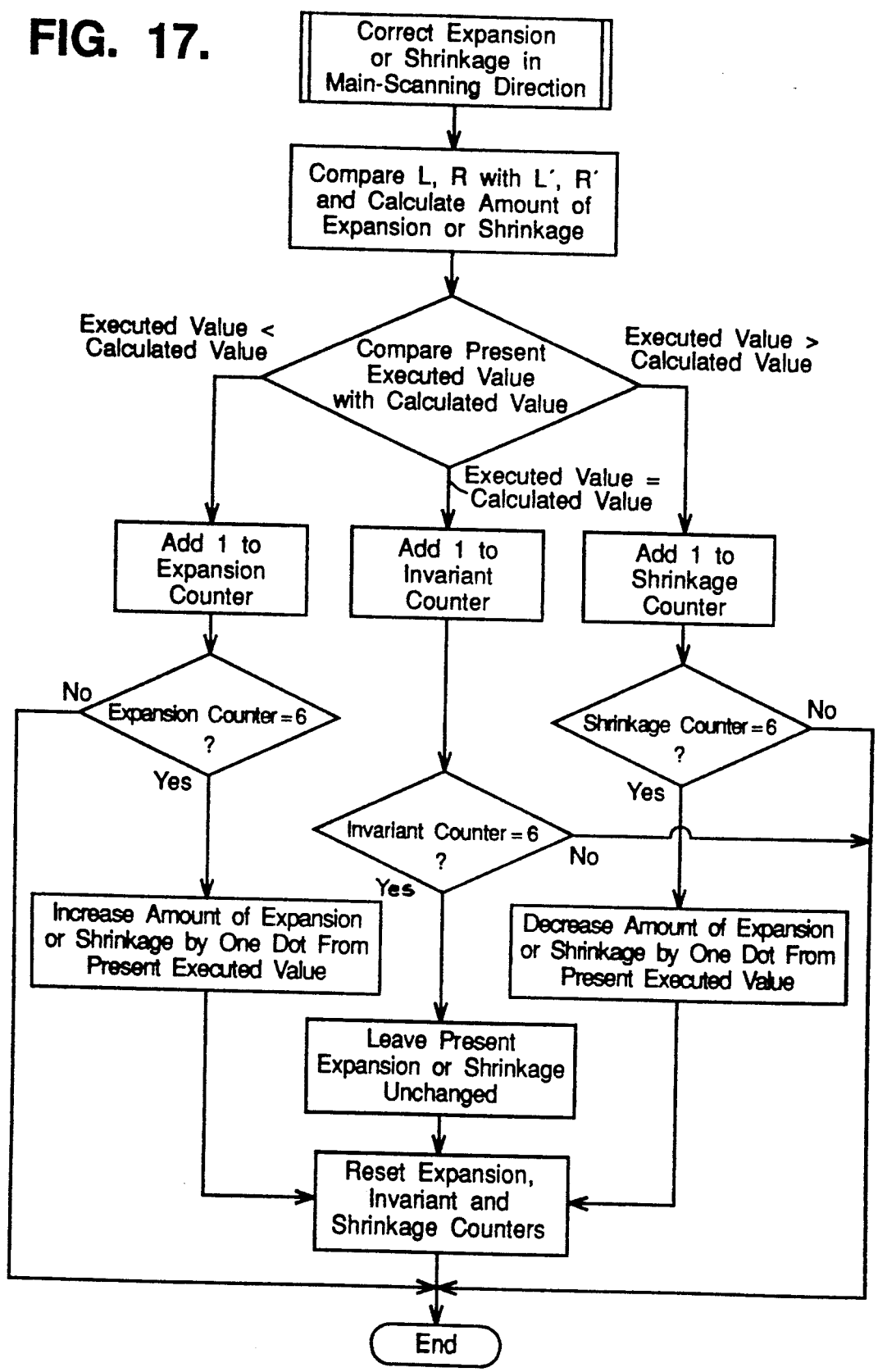
Figure 18:
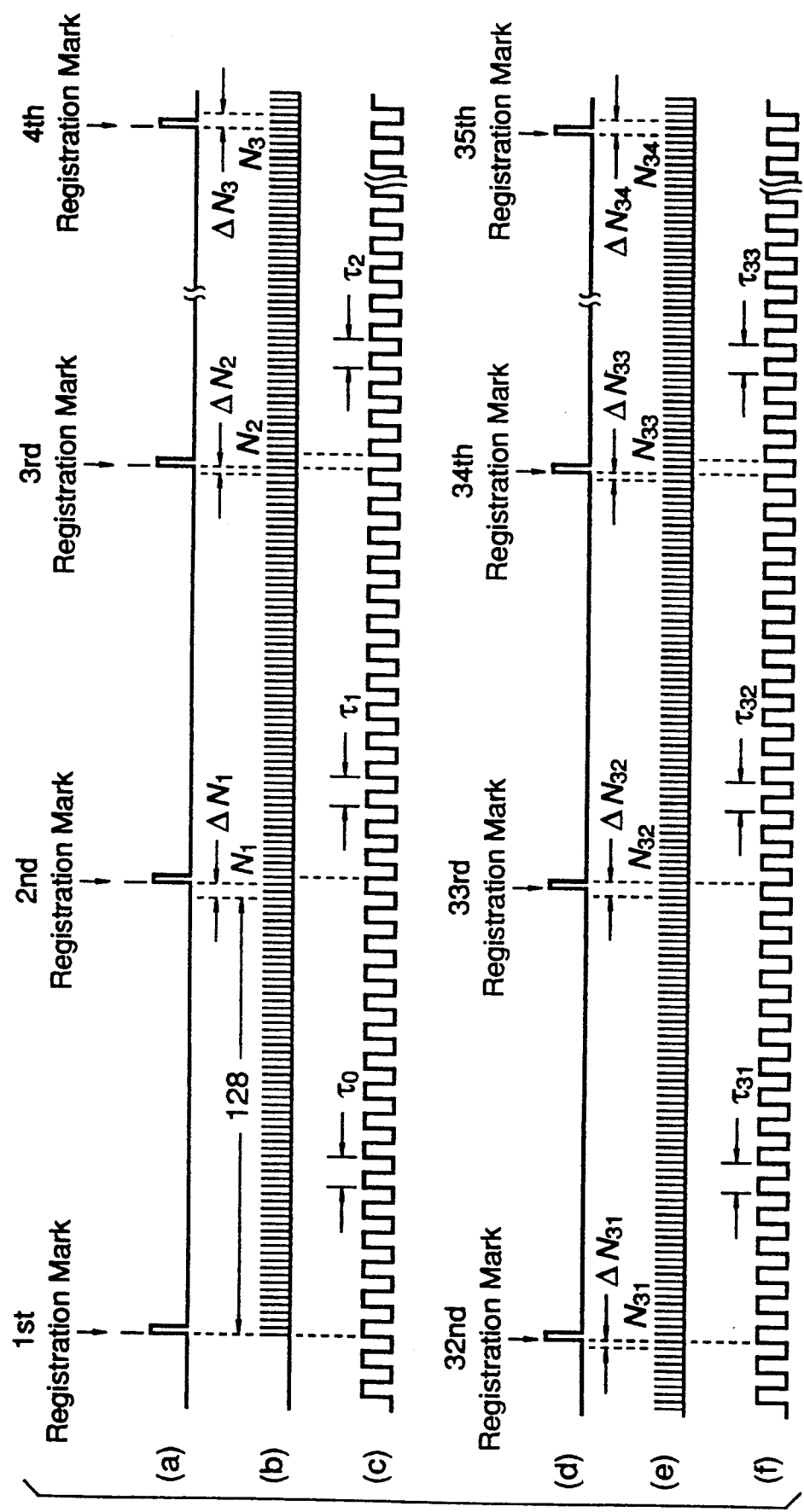
Figure 19:
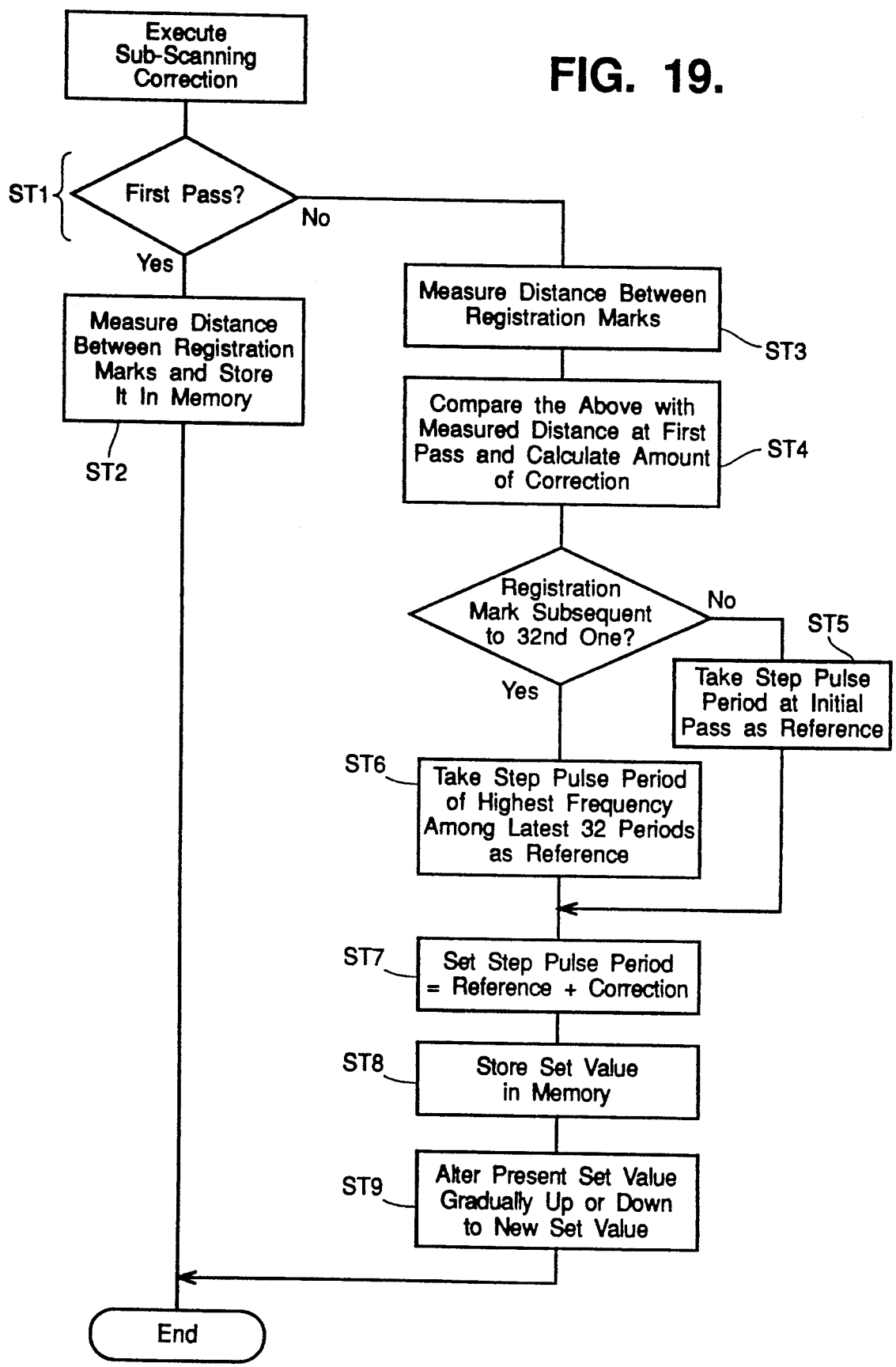
Figure 20:
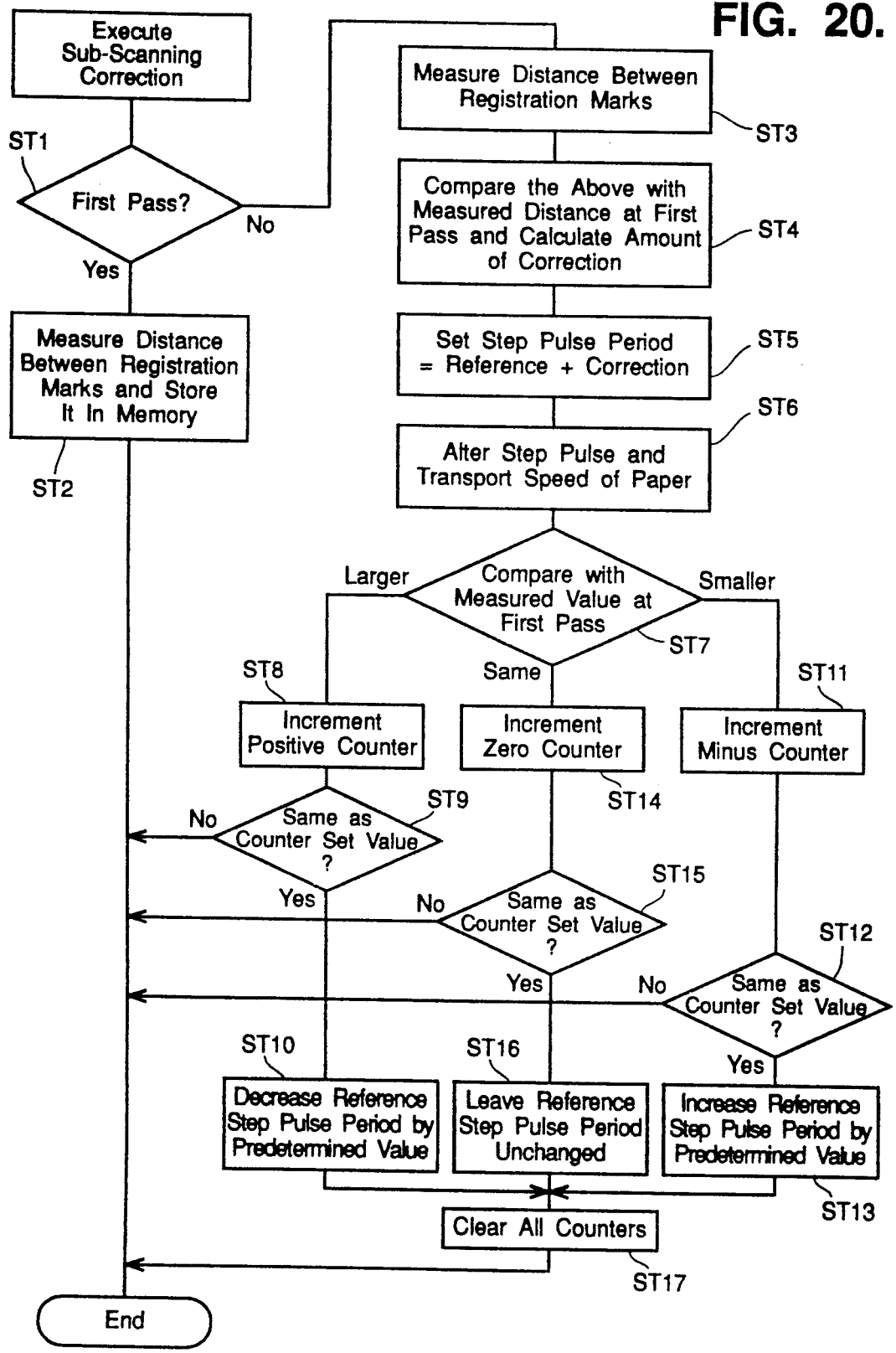
Figure 21:
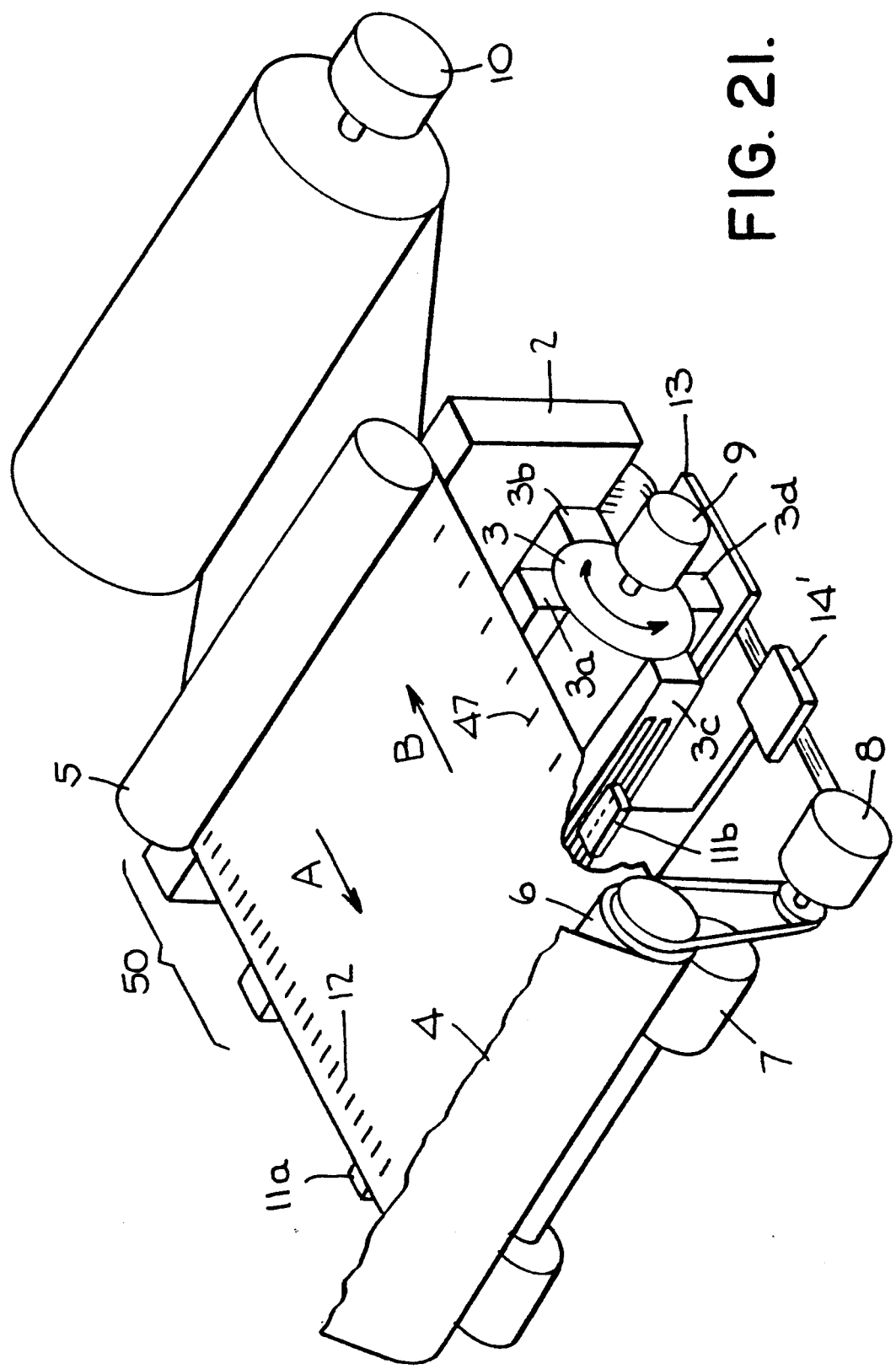
Figure 22A:
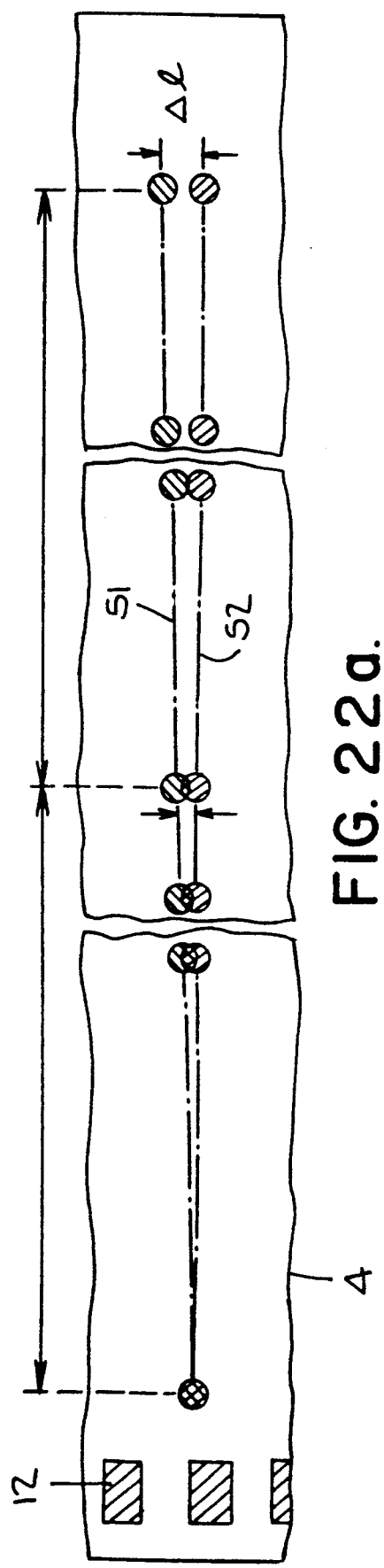
Figure 22B:
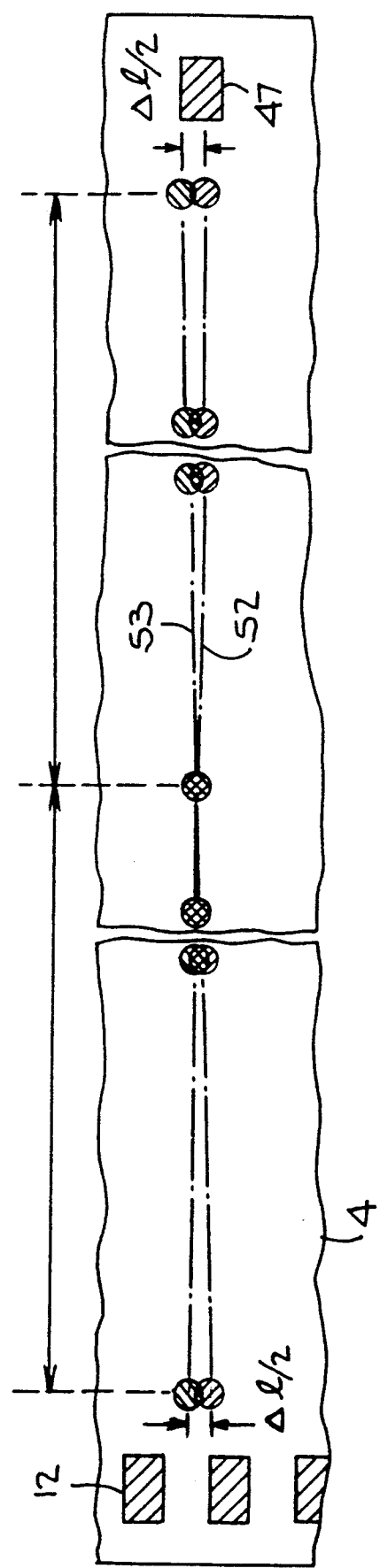
Figure 23:
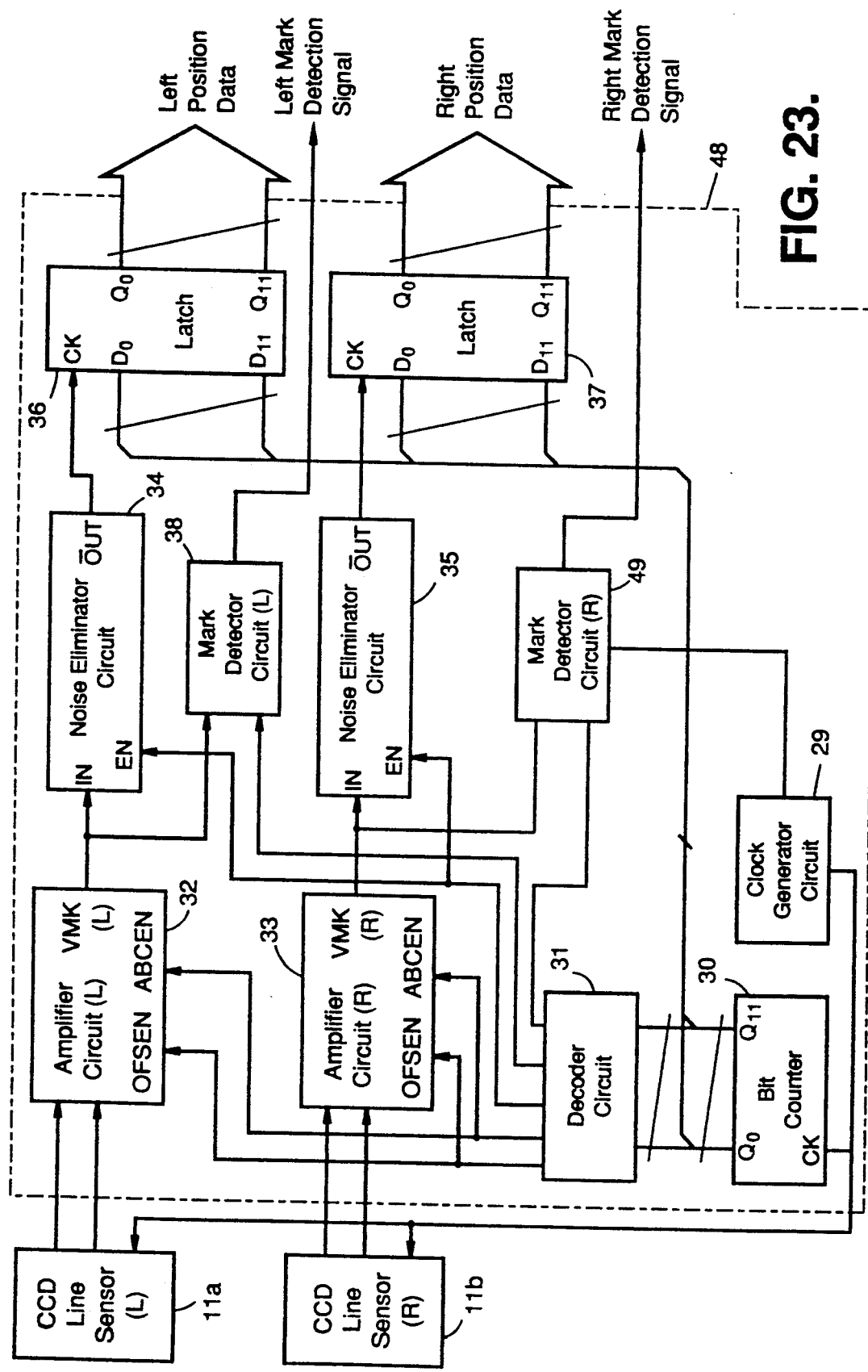
Figure 24:
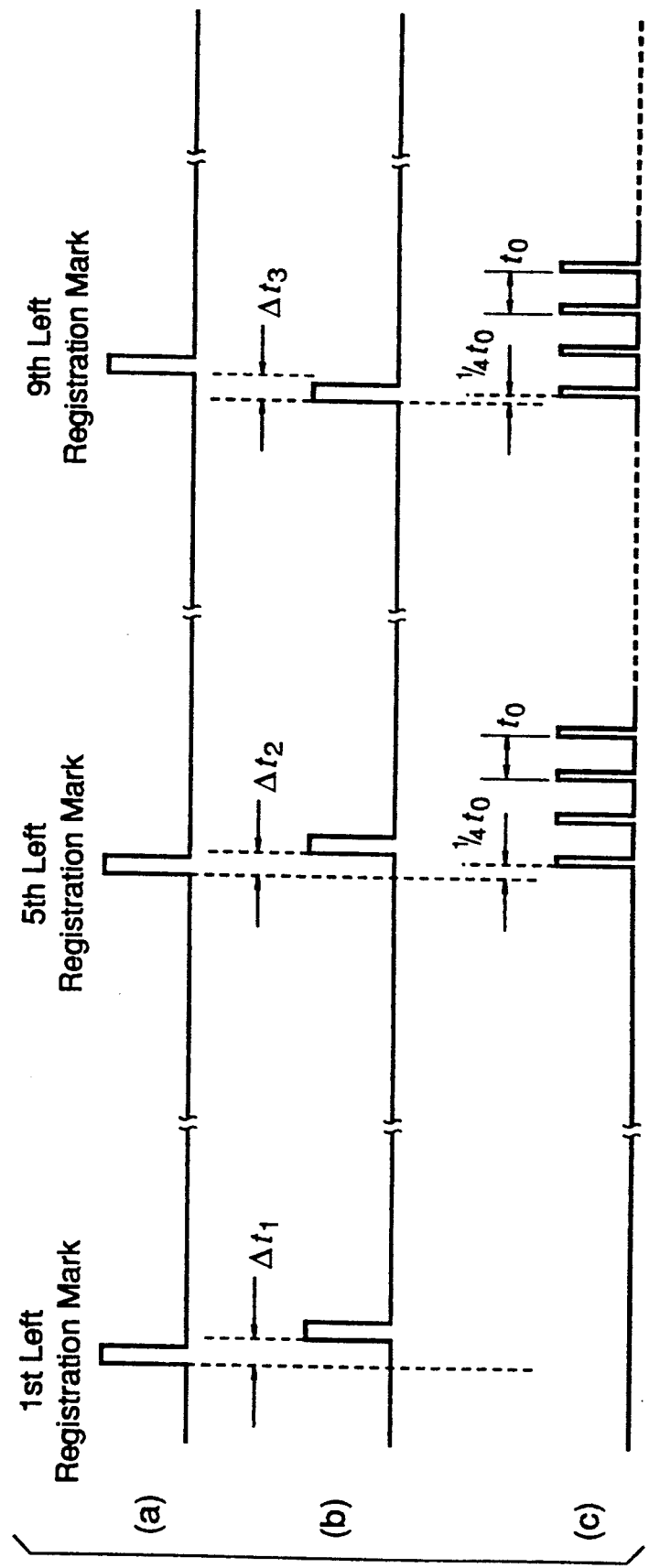
Figure 25A:
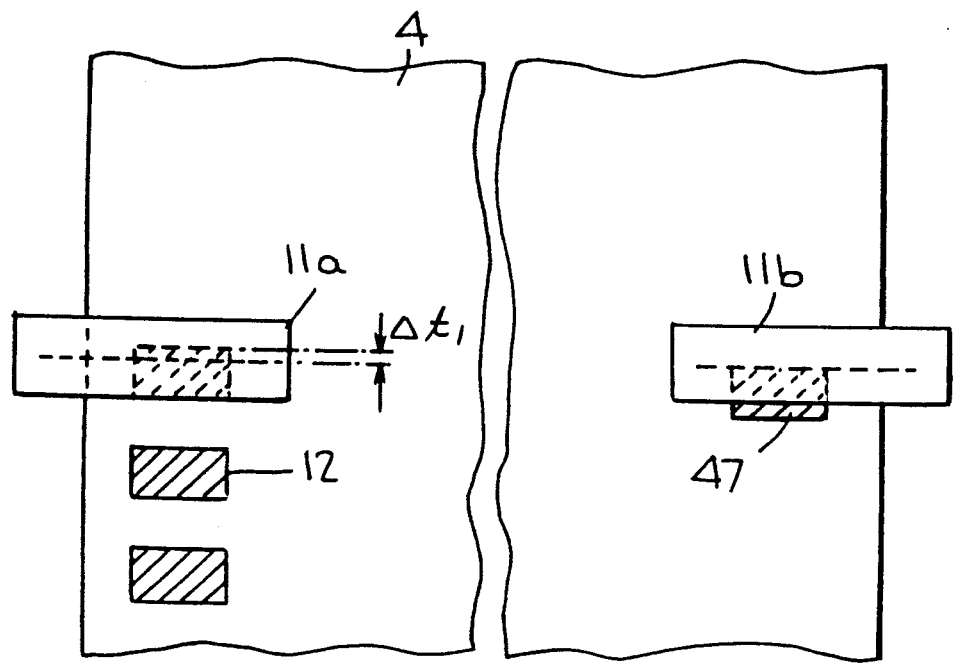
Figure 25B:
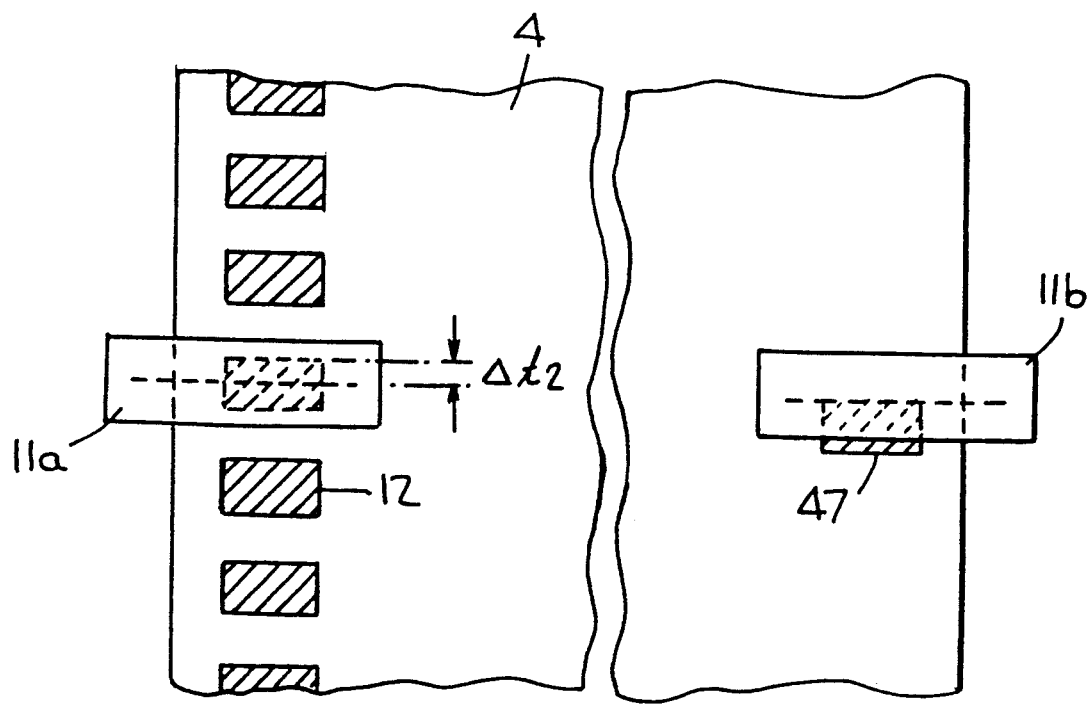
Figure 26:
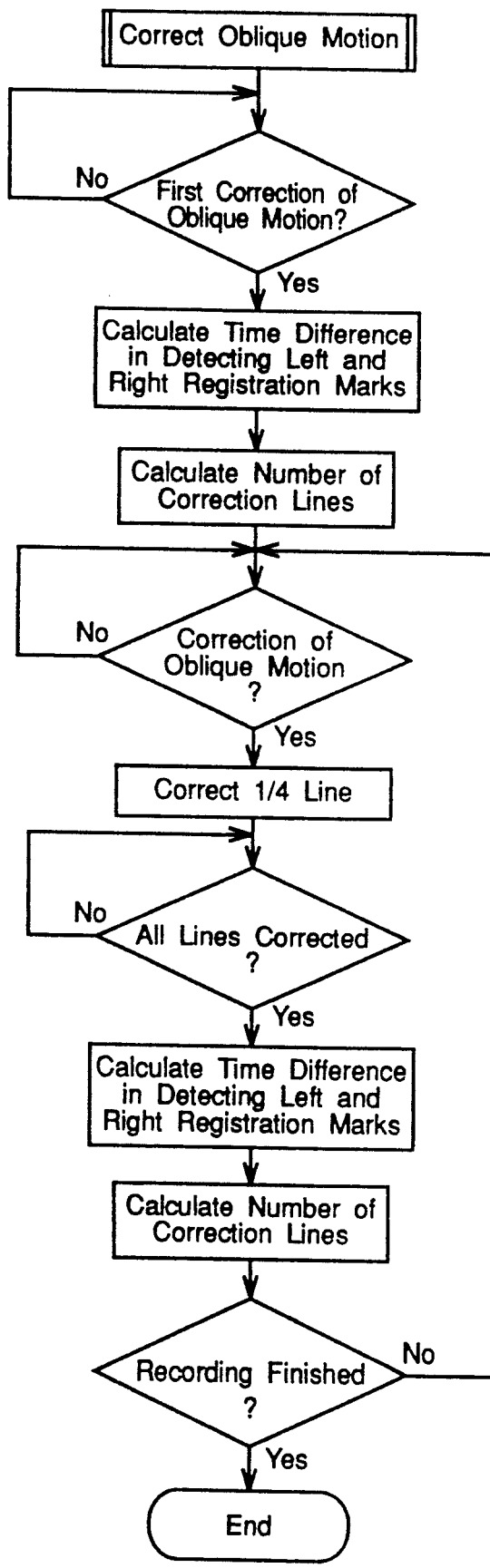
Figure 27:
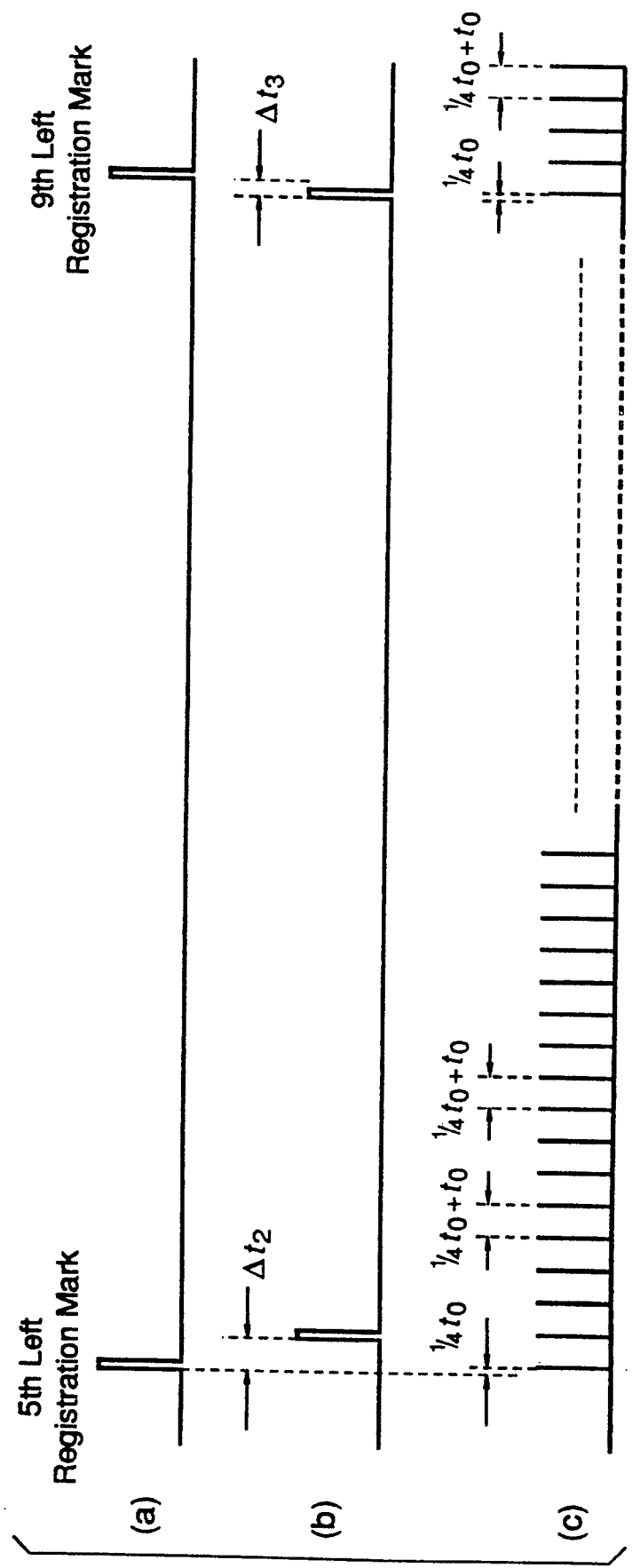
Figure 28:
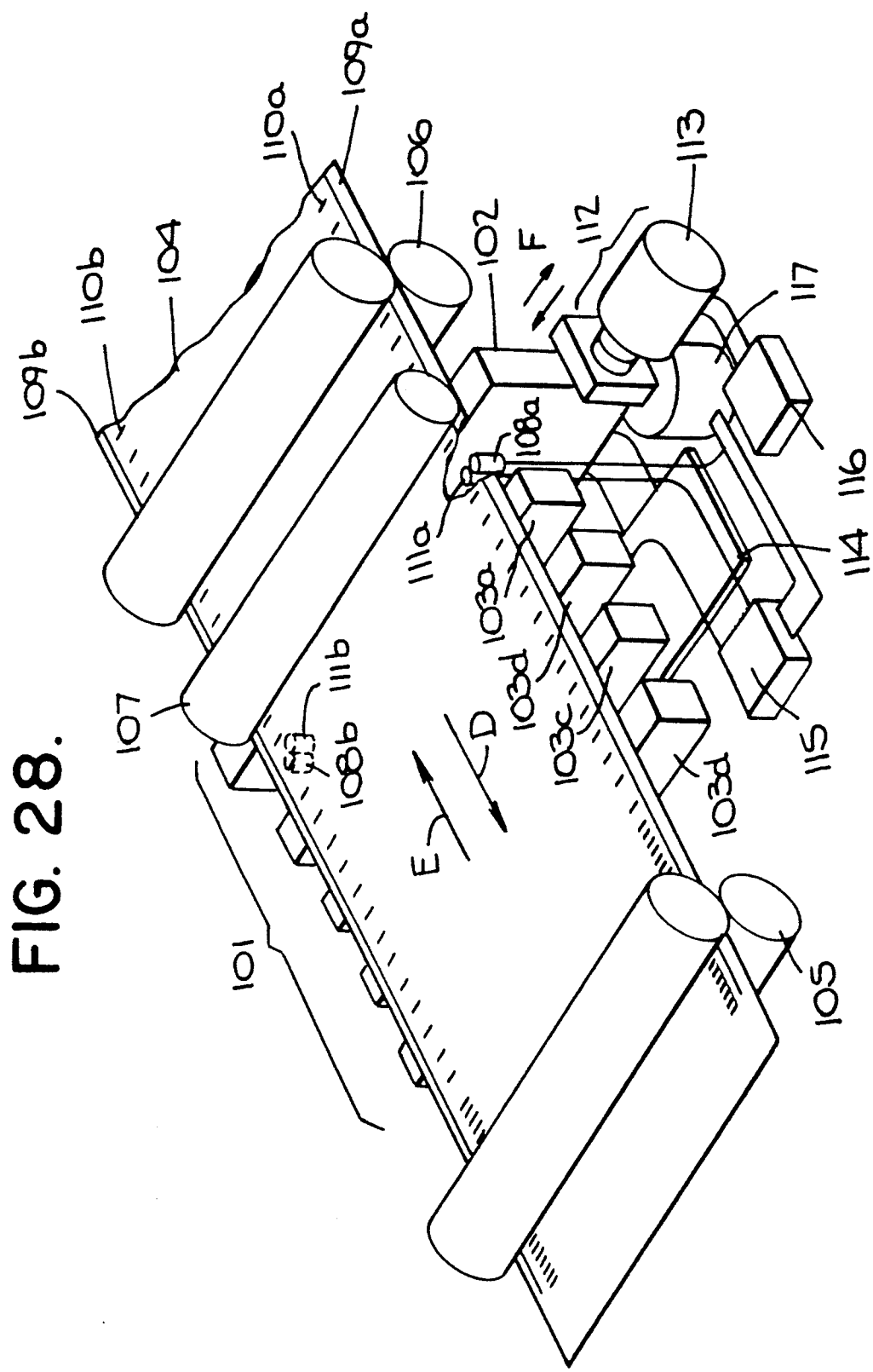
Figure 29:
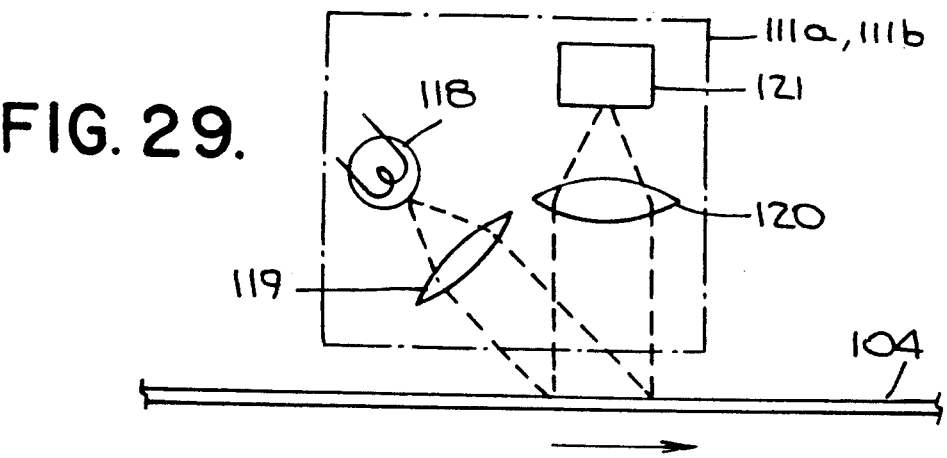
Figure 30:
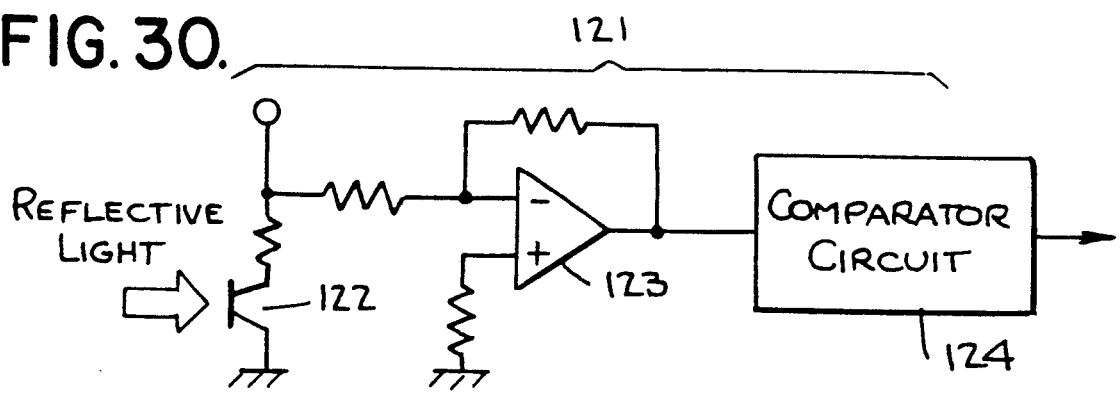
Figure 31:
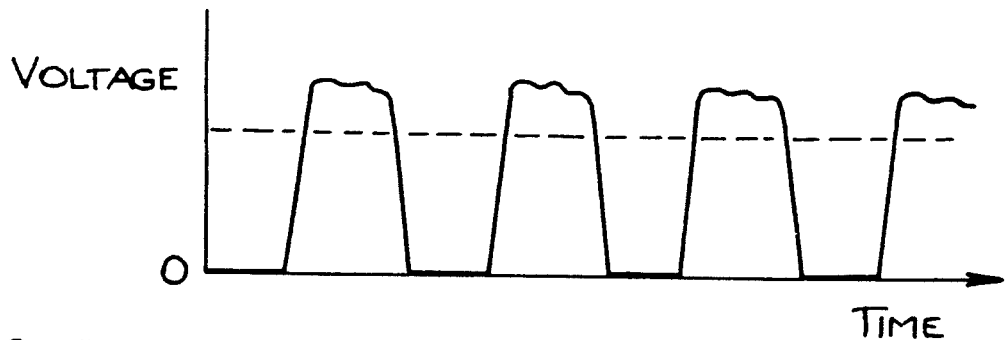
Figure 32:
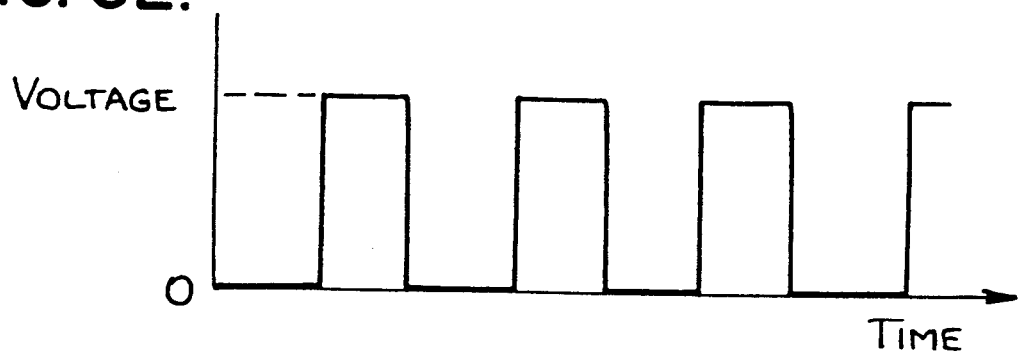
Figure 33:
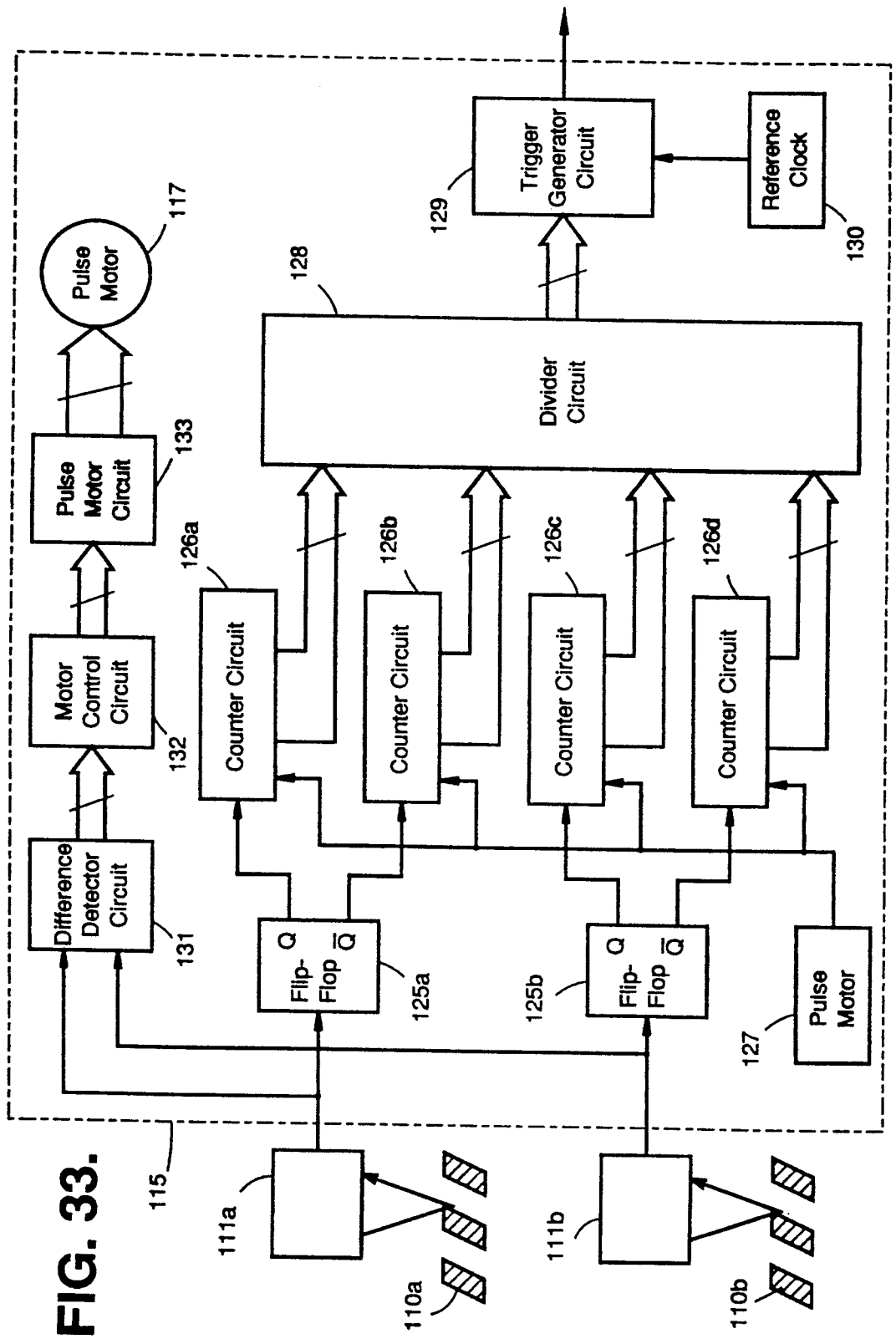
Figure 34:
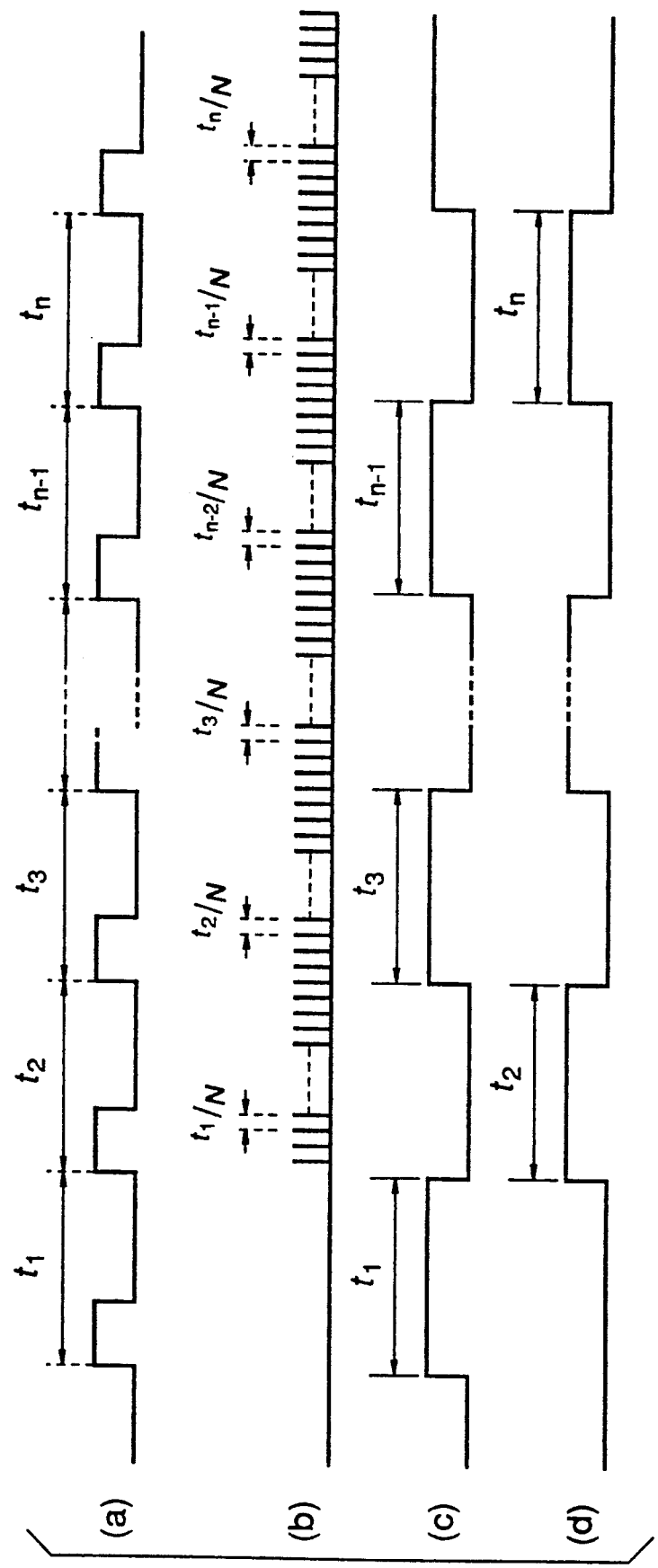
Figure 35:
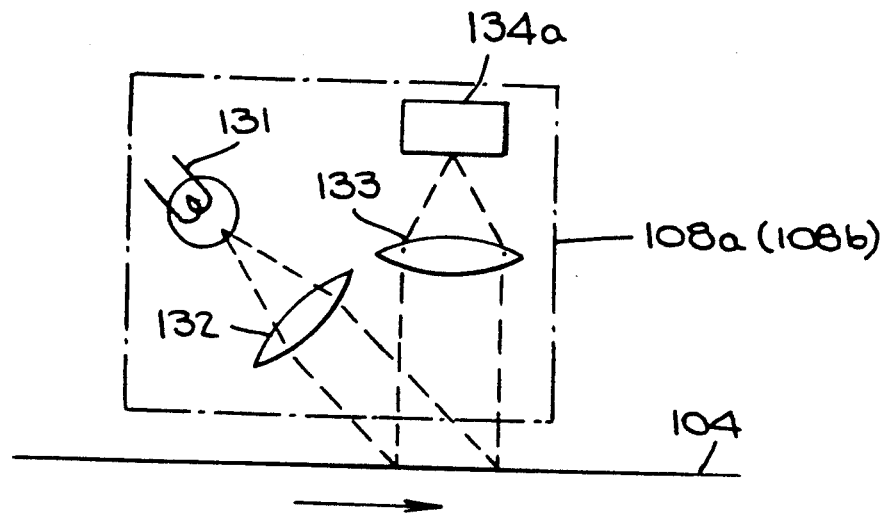
Figure 36:
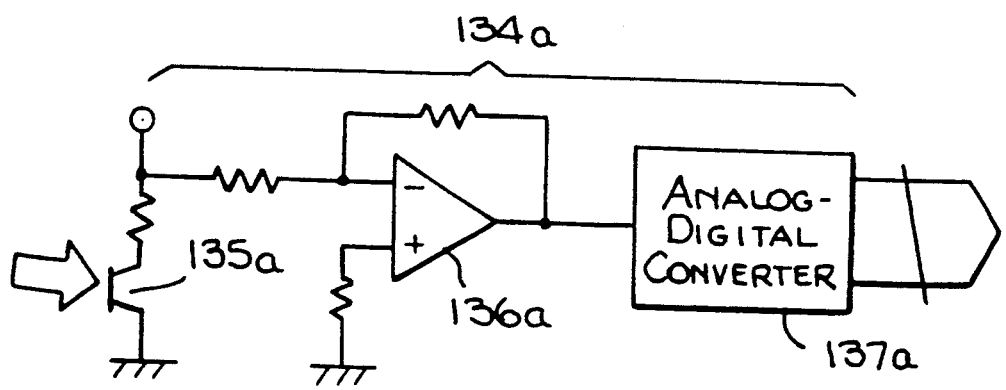
Figure 37:
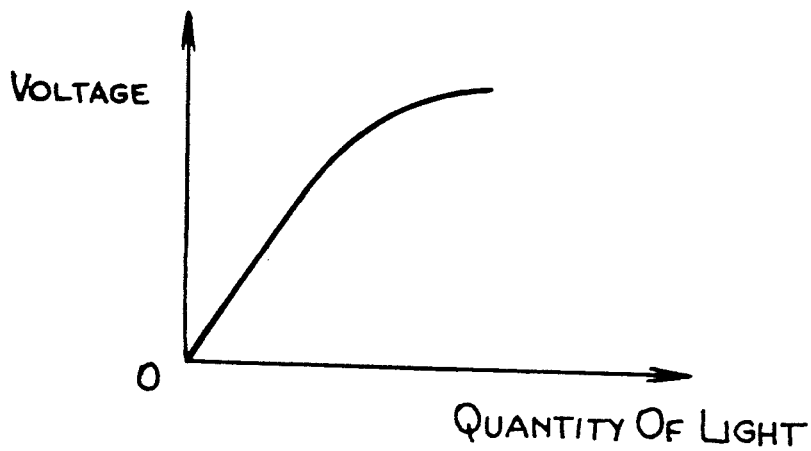

FIG. 8 graphically represents waveforms illustrating correction of the positions of the edges of the recording paper;

FIG. 9 graphically represents waveforms showing the relationship among the line sensor outputs, the edges of the electrostatic recording paper, and detection of the registration marks;

FIG. 10 graphically represents waveforms showing the relationship among the line sensor outputs, the edges of the electrostatic recording paper, and detection of the registration marks;

FIG. 11 is a plan view showing the relative positions of the paper and the line sensors during the first pass and subsequent passes of the recording paper through the recording apparatus of the invention;

FIG. 12 graphically represents the waveforms of the output signals obtained from the line sensors during the first and subsequent passes of the recording paper through the recording apparatus of the invention;

FIG. 13 is a flow chart showing the process for correction of paper shift executed during the detection of the first five registration marks;

FIG. 14 are tables for determining how to increase the number of picture elements in an image line to correct for paper shift;

FIG. 15 are tables for determining how to decrease the number of picture elements in an image line to correct for paper shift;

FIGS. 16 and 17 are flow charts showing the process for correcting for shifting, expansion and shrinkage of the recording paper in a direction orthogonal to the paper transport direction;

FIG. 18 graphically represents waveforms showing the mark detection signals and the pulse signals;

FIGS. 19 and 20 are flow charts showing the process for correcting for lengthwise expansion or shrinkage of the paper;

FIG. 21 is a schematic perspective view showing the structure of another improved color image recording apparatus constructed in accordance with the present invention;

FIGS. 22a and 22b are plan views showing uncorrected and corrected skewing of an image line;

FIG. 23 is a detailed block diagram of a measuring circuit;

FIG. 24 graphically represent waveform charts of a left mark detection signal, a right mark detection signal, and an output signal from a programmable timer;

FIGS. 25a and 25b are plan views showing the position of the left and right registration marks upon detection by the line sensors;

FIG. 26 is a flow chart showing the process for correcting for paper skew;

FIG. 27 graphically represents a timing chart showing how the oblique motion correction is executed; and FIG. 28 is a schematic perspective drawing of a prior art color image recording apparatus;

FIG. 29 is the construction of a mark detector used by the prior art color image recording apparatus of FIG. 28;

FIG. 30 is a circuit diagram of a photosensor used in the mark detector of FIG. 29;

FIG. 31 graphically represents the waveform of the output of an operational amplifier of a photosensor of FIG. 30;

FIG. 32 graphically represents the waveform of the final output obtained from the photosensor of FIG. 30;

FIG. 33 is a circuit diagram of a recording head controller in the prior art color image recording apparatus of FIG. 28;

FIG. 34 graphically represents the timing waveforms for the operation of the recording head controller of FIG. 33;

FIG. 35 shows the construction of a mark detector used by the prior art color image recording apparatus;

FIG. 36 is a circuit diagram of a photosensor used in the mark detector of FIG. 35;

FIG. 37 graphically represents the output of the photosensor of FIG. 36;

FIG. 38 is a series of drawings illustrating the positioning operation performed by the prior art color image recording apparatus; and FIG. 39 is a block diagram of a translation controller.

V. DESCRIPTION OF THE PREFERRED EMBODIMENTS OF THE INVENTION

The operation of the color image recording apparatus of the invention will now be described by reference to the apparatus shown in FIG. 1. FIG. 2 is a flow chart generally showing the steps required to create a color image on paper in accordance with the apparatus shown in FIG. 1.

Figure 1:
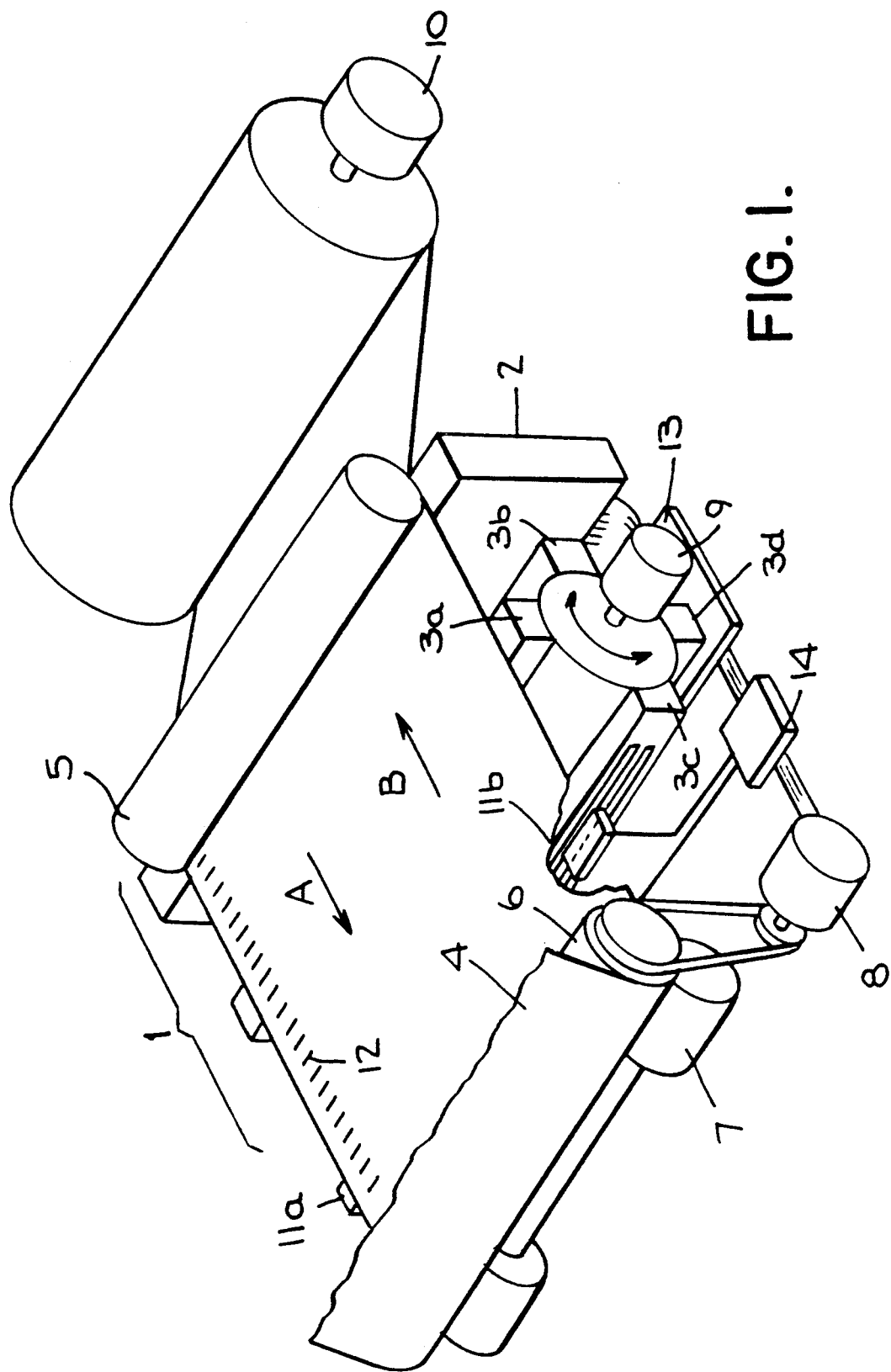
FIG. 1 is a schematic perspective drawing of an improved color image recording apparatus of the invention.
Figure 2:
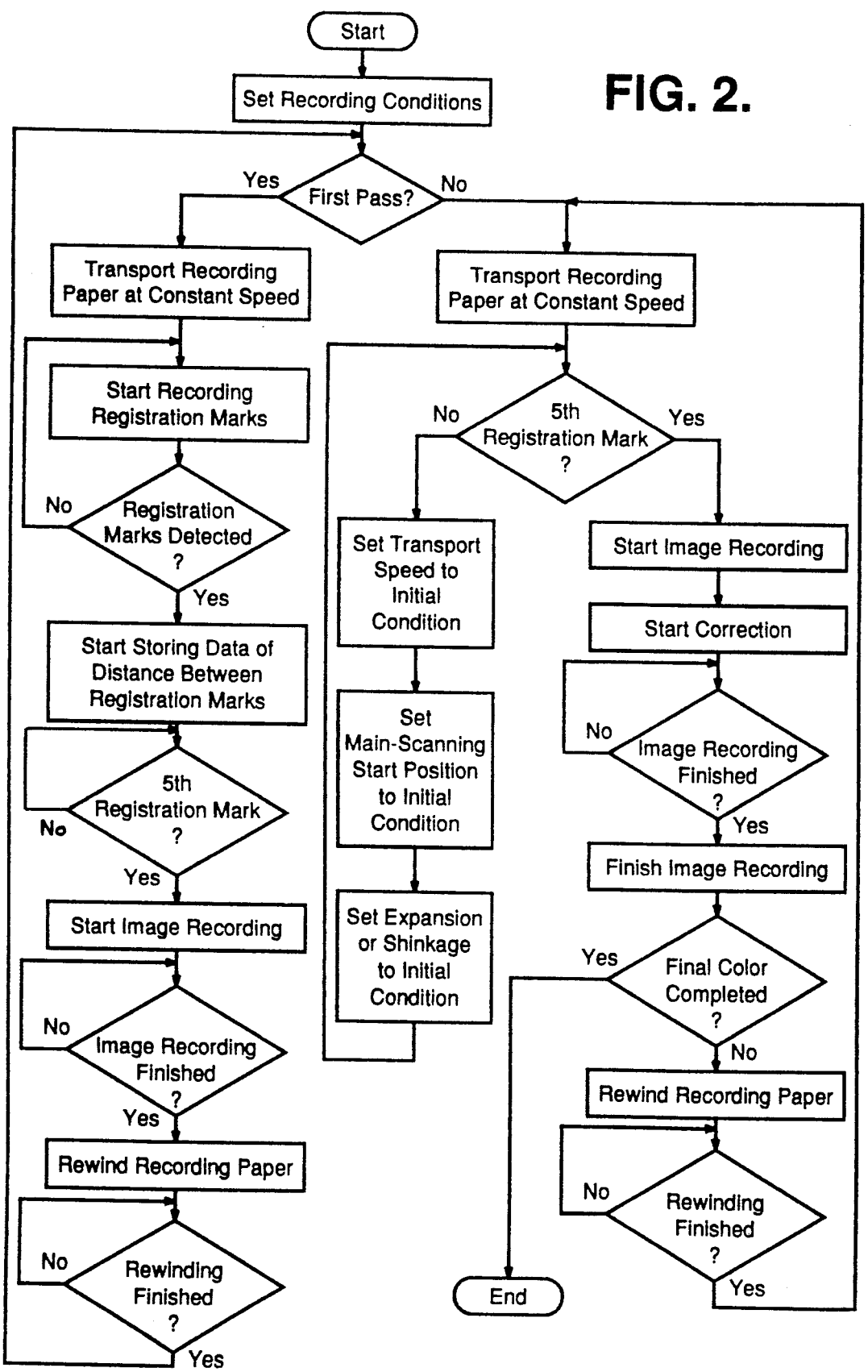
FIG. 2 is a flow chart of the process for superimposing color images according to the present invention.

Referring to FIG. 1, a color image recording apparatus 1 comprises an electrostatic recording head 2, a developing unit 3 on which developing heads 3a, 3b, 3c and 3d supplied with liquid developing agents of black, cyan, magenta, and yellow are mounted so as to be rotatable by a motor 9, and pad roller 5 for pressing electrostatic recording paper 4 against the recording head 2. A recording driver circuit 13 is connected to the recording head 2 to control the recording of latent images on paper 4. Paper 4 is transported in the forward direction, indicated by arrow A, by transport roller 6 and pinch roller 7 rotated by driving motor 8. Transport of paper 4 in the reverse direction, indicated by arrow B, is accomplished by take up motor 10. A left CCD line sensor 11a and a right CCD line sensor 11b each having 2,596 light receiving elements arranged in a row at a 14-micron pitch are provided for sensing registration marks 12 provided on the paper 4 along one or both edges. (For convenience, the registration marks 12 are shown in FIG. 1 on the upper surface of the paper 4 but in practice, registration marks are placed on the lower surface of paper 4.) As paper 4 is transported in the forward, A, direction, it first encounters recording head 2, then the developing unit 3, and then CCD line sensors 11a, 11b. Signals from the CCD line sensors 11a, 11b representing the positions of the edges of the paper 4 and each of the registration marks 12 are fed to control circuit 14.

Prior to beginning image recording, motor 9 for rotating the developing unit 3 is activated to move developing head 3a, supplied with a black liquid developing agent, to the developing position shown in FIG. 1. Paper 4 is then transported at a constant speed by transport roller 6, pinch roller 7 and driving motor 8 in the direction indicated by arrow A. As paper 4 passes through recording mechanism 1, electrostatic latent images corresponding to the registration marks 12 are formed every 128 image lines along one edge of paper 4 by recording head 2 energized from the recording driver circuit 13, and such latent images are rendered visible by developing head 3a. Thereafter the visualized registration marks 12 reach the left CCD line sensor 11a. Simultaneously with the detection of the registration marks 12 by the left CCD line sensor 11a, both CCD line sensors 11a, 11b detect the edges of paper 4. Data representing the position of the edges of paper 4 as detected by CCD line sensors 11a, 11b and the position of registration marks 12 are stored in a memory. Upon detection of the fifth registration mark by the left CCD line sensor 11a, recording signals corresponding to the black image are fed from the recording driver circuit 13 to recording head 2. Recording head 2 forms an electrostatic latent image corresponding to the black picture image on the electrostatic recording paper 4. The latent image is then rendered visible by the developing head 3a.

After the black picture image has been completely formed, take up motor 10 is actuated to wind paper 4 in the reverse direction, indicated by arrow B in FIG. 1, to return paper 4 to its initial starting position. Subsequently developing head 3b supplied with a liquid developing agent of a second color (e.g. cyan) is rotated to the developing position by motor 9. Electrostatic recording paper 4 is again transported by transport roller 6, pinch roller 7 and driving motor 8 in the forward, A, direction.

When registration marks 12 are detected again by the left CCD line sensors 11a, the position of both edges of paper 4 is detected by the CCD line sensors 11a, 11b. Control circuit 14 compares this position data with the data previously stored during the first pass of paper 4 through the apparatus. This comparison provides the positional deviation of the left edge of paper 4 during the second pass from its position during the first pass. In other words, the amount of expansion or shrinkage of paper 4 in the direction perpendicular to its transport is now known The latent image is corrected based upon this data in accordance with an algorithm which is described below. This corrected image data is fed to the recording driver circuit 13.

At the same time as the edge position data is collected and processed, the control circuit 14 measures the time interval between every adjacent registration mark 12 passing left CCD line sensor 11a. Thereafter, driving motor 8 is controlled so that in the distance between adjacent registration marks 12 are recorded a predetermined number of picture elements in accordance with the algorithm which will also be described below. This operation is carried out until the second color image (e.g. cyan) is complete. Paper 4 is then again wound back to its initial position by take up motor 10.

The operation used for creating the second color image is repeated for the third color (e.g. magenta) and the fourth color (e.g. yellow), with each of these colors being superimposed on the previously formed images. After the of the fourth color image is completed, paper 4 is discharged from the apparatus and the apparatus is ready to duplicate another image.

Figure 3:
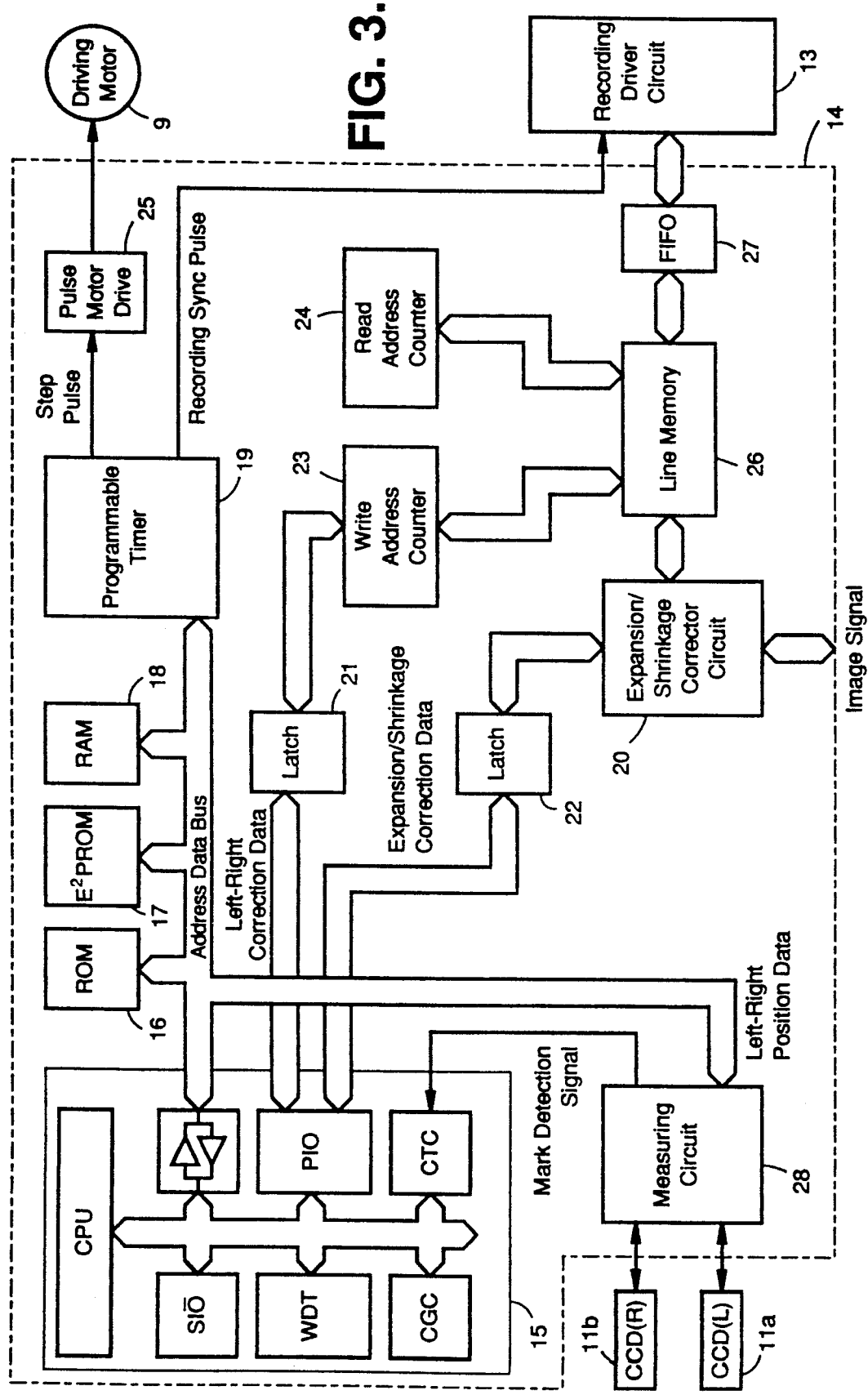
FIG. 3 is a block diagram of a control circuit employing a microcomputer of the present invention.

The process for forming the color images is carried out using a software controlled microcomputer in control circuit 14, which is shown in FIG. 3. Referring to FIG. 3, the microcomputer 15 is comprised of a central processing unit (CPU), an address/data bus driving circuit, a parallel input/output circuit (PIO), a counter/timer circuit (CTC), a watchdog/register circuit (WDT), and a clock generator circuit (CGC). Control circuit 14 also includes ROM 16 with programs stored therein, a EEPROM 17, RAM 18, and programmable timer 19, which provides step pulses to pulse motor drive 25 and a recording sync pulse to recording drive circuit 13. Expansion/shrinkage correction circuit 20 is used for expanding or shrinking the image signals based on information transferred from the microcomputer 15. Latch circuits 21, 22 hold left and right correction data and expansion/shrinkage correction data. Write address counter 23 corrects the main scanning start position of the image signals on the basis of the left and right correction data and specifies addresses to write the image signals in line memory 26. Read address counter 24 specifies addresses to read out the image signals from line memory 26. FIFO circuit 27 rearranges the image signals obtained from line memory 26. Pulse motor driver circuit 25 controls driving motor 9 in response to step pulses under program control of programmable timer 19. Measuring circuit 28 produces a mark detection signal and left and right position data in response to signals from the CCD line sensors 11a, 11b.

Figure 4:
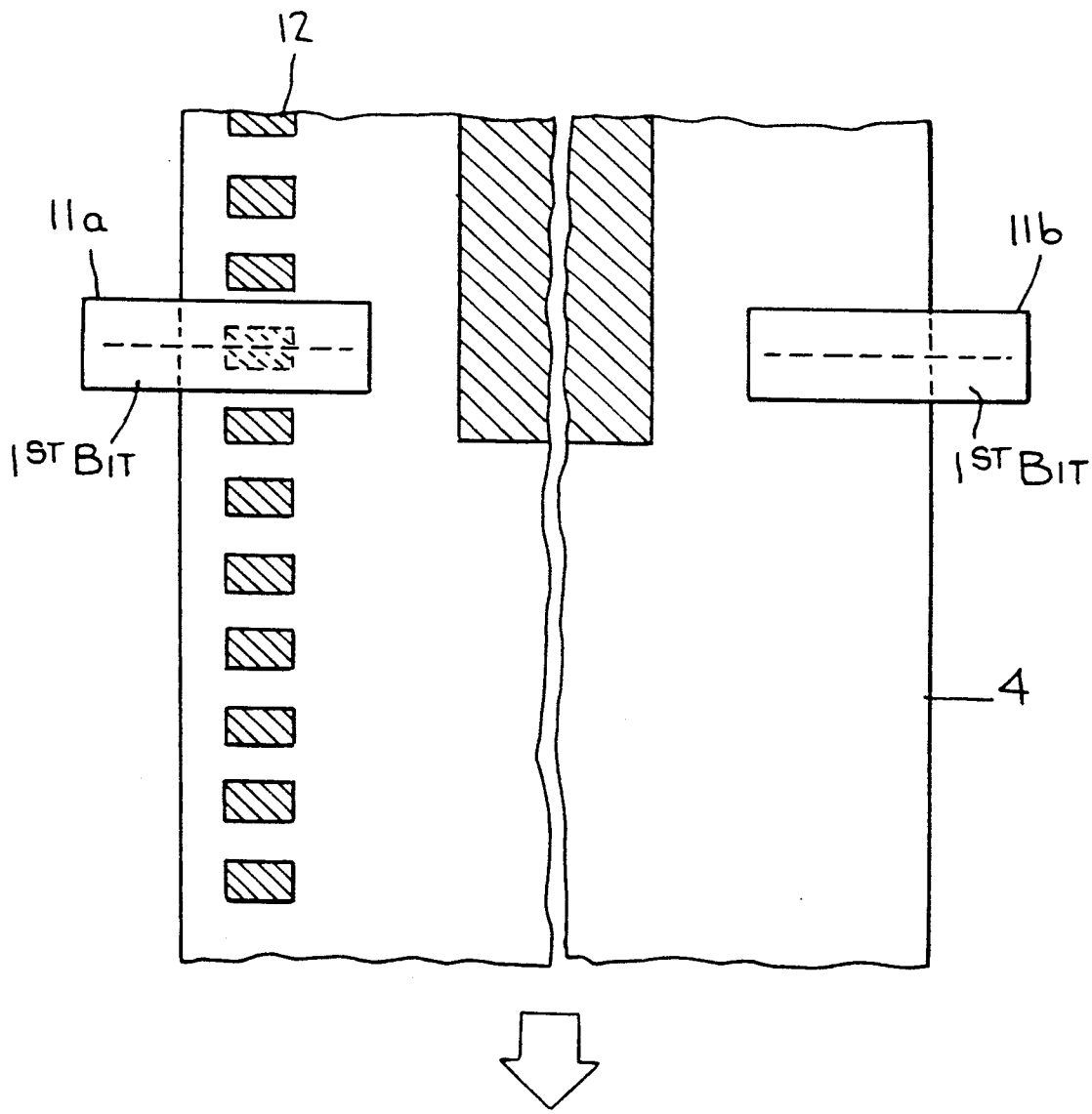
FIG. 4 is a plan view illustrating the positional relationship between registration marks and line sensors of the present invention.
Figure 5:
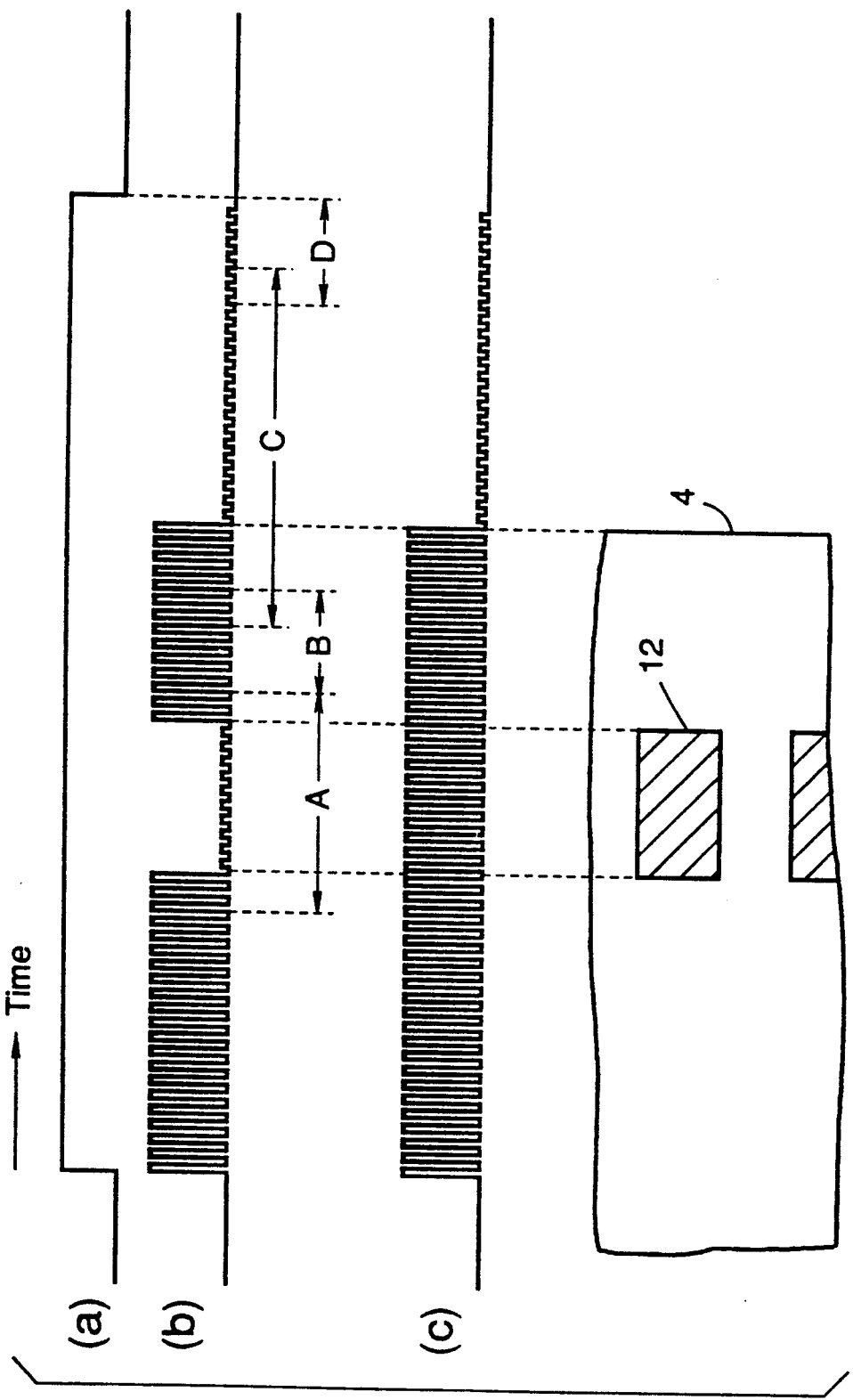
FIG. 5 is a comparison of a plan view showing the registration marks and the edge of the paper with a graphical representation of the waveform of signals from the line sensors.

FIG. 4 illustrates the positional relationship between registration marks 12 formed on paper 4, the edges of paper 4, and the CCD line sensors 11a, 11b. The output signals from the CCD line sensors are produced in bits as the CCD line sensors cycle through their field of view. The CCD line sensors 11a, 11b are located so that the first signal from each sensor is above paper 4 and the sensors sense in the outward direction relative to the paper. In the illustrated embodiment, left CCD line sensor 11a serves to detect the registration marks 12 and the left edge of paper 4, while CCD line sensor 11b serves to detect the right edge of paper 4. The relationship between the registration marks 12 and the output signals from the CCD line sensors 11a, 11b is shown in FIG. 5. FIG. 5(a) represents a reading period signal generated cyclically to be used for the CCD line sensors 11a, 11b. FIG. 5(b) represents a waveform obtained when a registration mark 12 and the left edge of paper 4 are detected by the CCD line sensor 11a. FIG. 5(c) represents a waveform obtained when the left edge and the right edge of the paper 4 are individually detected by the CCD line sensors 11a and 11b, respectively.

When the CCD line sensors 11a, 11b detect light reflected from paper 4, their outputs are turned to high (H) levels. No light is reflected from paper 4 when a registration mark is present or there is no paper, that is, beyond the edge of the paper. On the absence of reflected light from paper 4, the outputs of the CCD line sensors 11a, 11b are turned to low (L) levels. Accordingly, as left CCD line sensor 11a detects the left edge of paper 4 and registration marks 12 as shown in FIG. 5(b), the first output bit of left CCD line sensor 11a is turned to an "H" level until a registration mark 12 is encountered. As the left line sensor 11a scans across the width of the registration mark 12, the output signal is an "L" level. Between the outer edge of the registration mark 12 and the edge of paper 4, the output signal is at the "H" level. Finally, beyond the edge of paper 4 where no light is reflected from paper 4, the output of the CCD line sensor 11a is turned to an "L" level. When the left CCD line sensor 11a is not detecting a registration mark, its output signal is high from its first bit until the edge of paper 4. At the edge of paper 4 the output signal turns low. Accordingly, as shown in FIG. 5(b), the presence of a registration mark 12 can be determined by the a low signal in region A. Likewise, the position of the edge of paper 4 is determined by the low signal in region C.

Figure 6:
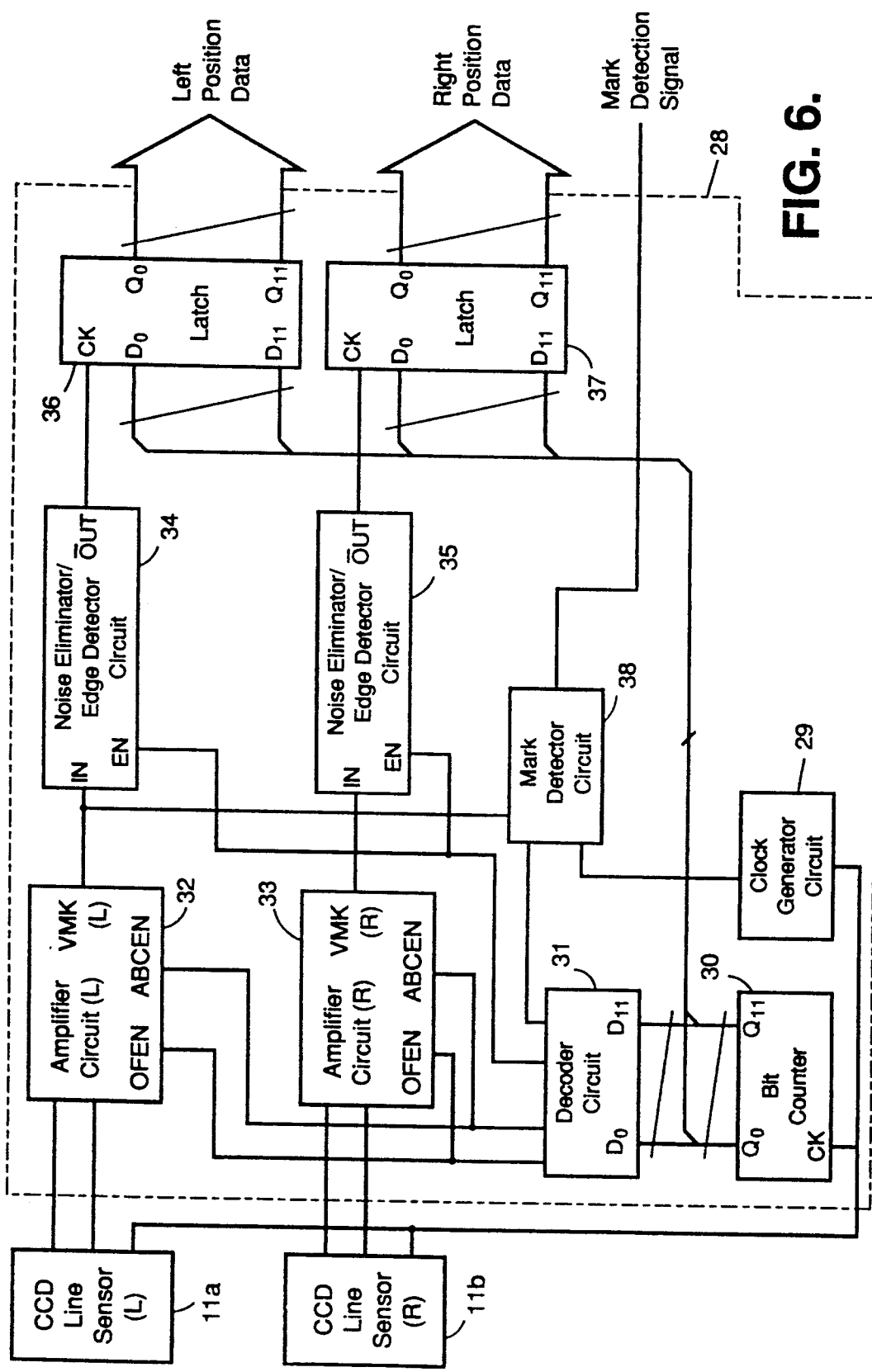
FIG. 6 is a block diagram of a measuring circuit for calculating mark detection signals and left and right position data from the outputs of line sensors of the present invention.

Referring to FIG. 6, the measuring circuit 28 comprises a clock generator circuit 29 for generating a clock signal for counting the number of bits of the CCD line sensors 11a, 11b. Bit counter 30 and decoder circuit 31 decode the outputs of the bit counter and produce gate signals to latches 36, 37. Amplifier circuits 32, 33 amplify or correct the outputs of the CCD line sensors 11a, 11b. Noise eliminator/edge detector circuits 34, 35 eliminate noise from the amplified outputs of the CCD line sensors 11a, 11b and detect the position of the edge of paper 4. Latch circuits 36, 37 latch or [hold] the counted values of the bit counter 30 synchronously with the edge detection signals delivered from the noise eliminator/edge detector circuits 34, 35 respectively so as to supply latched data to a data bus. Mark detector circuit 38 detects a registration mark signal from the amplified output signal of the left CCD line sensor 11a and outputs a mark detection signal (trigger signal).

Variations in the reflectivity of paper 4 cause the output signals from the CCD line sensors to be somewhat unstable. Therefore, as shown in FIG. 5(b), a background control is performed on the signals in region B and an offset control is performed on the signals in region C to correct the output signals to ensure exact detection of the registration marks 12 and the edge of paper 4.

Figure 7:
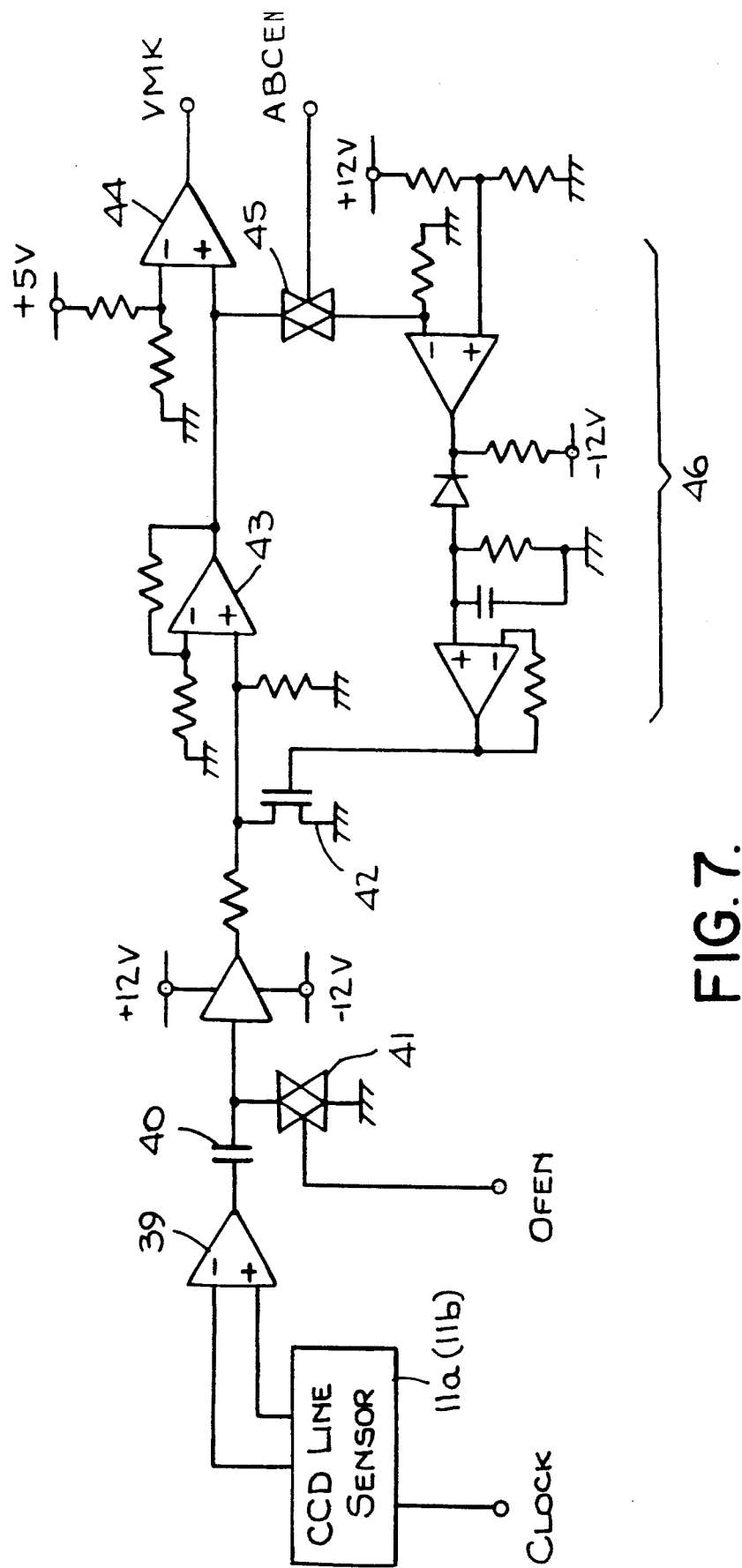
FIG. 7 is a circuit diagram of an amplifier circuit.

FIG. 7 is a circuit diagram showing details of amplifier circuits 32, 33. Each amplifier circuit 32, 33 includes a differential amplified 39; a capacitor 40; an analog switches 41, 45; a voltage resistor element 42; non-inverting amplifiers 43, 44; and a feedback circuit 46. The output signals from the CCD line sensors 11a, 11b are supplied to the differential amplifier 39. The output of the differential amplifier 39 is not sufficient to induce complete separation of the "H" level, which represents reflected light from paper 4, from the "L" level, which represents no reflected light. Accordingly, in order to accurately sense the edge of paper 4, it is necessary to perform a correction on the offset values using the output signal obtained beyond the edge of paper 4 as reference value. To achieve this, analog switch 41 is fed an offset enable signal (OFEN), shown in FIG. 8(e), having an effective period corresponding to region D of FIG. 5(b) obtained at the end of one output cycle from each CCD line sensor 11a, 11b. Capacitor 40 is charged to a voltage as applied from the CCD line sensor 11a, 11b during the "H" level period of the signal shown in FIG. 8(e). This charge is used as the offset value.

In addition, in order to obtain signals of sufficient gain while eliminating variations in the "H" level, the analog switch 45 used to actuate feedback circuit 46 is controlled by a background enable signal (ABCEN) depicted in FIG. 8(c). This signal corresponds to the high signal generated in the blank space on paper 4 between the edge of the registration mark 12 and the edge of paper 4, shown as region B in FIG. 5(b). In other words, the resistance of the variable resistor element 42 is determined by a feedback signal at a time when one of the CCD line sensors 11a, 11b senses the blank space on paper 4. The amplification factor of the non-inverting amplifier 43 is then determined, whereby a circuit constant is established such that sufficient gain is obtained as an output. The outputs of the CCD line sensors 11a, 11b thus amplified and corrected are delivered to the noise eliminator/edge detector circuits 34, 35. In circuits 34, 35, an edge detection region is set in the output signal from one of the CCD line sensors 11a, 11b by edge detection enable signals shown in FIGS. 8(d) and 9(a), assuring detection of the edge of paper 4. When one of the CCD line sensors 11a, 11b senses the edge of recording paper 4, consecutive bits having the "L" level are produced.

An error canceling function is also provided that can cancel an "L" level bit in the midst of a series of "H" bits, produced, for example, by dust on paper 4 (FIG. 9(b)). An error detector circuit begins to operate in response to a change in the output signal from the CCD line sensors 11a, 11b from an "H" level to an "L" level during the "H" level period of the edge detection enable signal. For example, the circuitry recognizes five consecutive "L" level bits (FIG. 9(b)) from the CCD line sensor as the edge of paper 4 and outputs an edge detection signal, shown in FIG. 9(c). Thus, if a single "L" level bit is encountered among a series of "H" bits (FIG. 9(b)), the edge detection signal is not generated. This circuit can be formed using only a flip-flop and a counter. This method will eliminate faulty detection of the edge of paper 4 and eliminates false "L" signals caused, for example, by dust. However, this method causes a five bit timing difference between the detection of the edge of paper 4 and the generation of the edge detection signal. This timing difference can easily be corrected through arithmetic processing. This example uses a five bit sample, but an optimum value should be chosen based on the construction of the system.

The edge detection signal from the noise eliminator/edge detector circuits 34, 35 corresponding to the left and right edges of paper 4 is transferred to the latch circuits 36, 37, shown in FIG. 6. Meanwhile, bit counter 30 supplies latch circuits 36, 37 with input signal $D_0$ corresponding to the number of bits output by the CCD line sensors 11a, 11b. Once the edge of paper 4 is recognized the counter signal supplied by the bit counter corresponding to the edge is held by the latch circuits, 36, 37 to supply the microcomputer 15 with the left and right position data for the edges of paper 4.

The detection of registration marks 12 is carried out by the mark detector circuit 38. FIG. 10(b) shows the output signal of the CCD line sensor 11a as the sensor goes through several cycles. During each cycle, the CCD line sensor first detects no paper and produces an "L" level signal; when the sensor detects the edge of the paper it produces "H" signals. When a predetermined number, e.g., five, of consecutive "L" signals are detected in the midst of the "H" signals, the mark detector circuit 38 recognizes this as a registration mark 12 and outputs an "H" signal. This operation is performed for each cycle of the CCD line sensor 11a producing a timing pulse having a period $T_n$ shown in FIG. 10(c). $T_n$ represents the time between successive registration marks 12 as paper 4 is transported through the apparatus. Errors in the signals from the CCD line sensor are eliminated using the same method used by the noise eliminator/edge detector circuits 34, 35. When the "L" level state is successively detected for five periods the mark detection signal having the period $T_n$ (which is not constant for all successive registration marks) shown in FIG. 10(c) is output from the mark detector circuit 38 and fed to the microcomputer 15.

Once the apparatus is able to detect the position of paper 4 by sensing the edges and the registration marks, the apparatus is then able to produce the four color images in registry. During the first pass of paper 4 through the apparatus 1, paper 4 is moved at a constant speed by the pulse motor 8 controlled by the pulse motor driving circuit 25 receiving a series of step pulses of a given period $T_0$. The registration marks 12 are recorded at an equal pitch of 128 image lines along the left edge of paper 4. The registration marks 12 are developed completely by the developing device 3 and detected simultaneously with the left edge of paper 4 by the left CCD line sensor 11a located immediately beyond the developing device 3. The right edge of paper 4 is also simultaneously detected by the right CCD line sensor 11b located opposite to the left CCD line sensor 11a. The information thus obtained is converted into the left and right position data by the measuring circuit 28 and then delivered to the microcomputer 15 as described above. The microcomputer 15 stores in memory information about the spacing of the registration marks 12 and the position data of the left and right edges of paper 4 at each registration mark.

The black image recording begins when the fifth registration mark 12 is detected. The operation may be modified so that only the registration marks 12 are recorded during the first pass, and the black image is recorded at a later pass. Referring to FIG. 3, in recording the black image, the microcomputer 15 outputs expansion/shrinkage correction data and left and right correction data such that the expansion/shrinkage correction circuit 20 produces a zero correction. The initial value of the write address counter 23 is set to 128 so as to start the main scanning from the 128th bit of the electrostatic recording head 2. In addition, the step pulse fed from the programmable timer 19 to the pulse motor driver circuit 25 is also set to a constant value to determine the number of revolutions of the driving motor 9.

The relationship between the registration marks 12 and the black image is set as follows. First, the image recording begins when the left CCD line sensor 11a has detected the fifth the registration mark 12. The transport speed of paper 4, determined by the revolution rate of the driving motor 8 and the period for energizing the recording driver circuit 13, is set to a constant value so that the distance between the leading edge of successive registration marks 12 is 128 image lines of picture elements. During the first pass there is no need to correct this setting.

Once the registration marks 12 and the black image are recorded on paper 4, and the positions of the left and right edges and the registration marks 12 are stored in memory, paper 4 is wound back to its initial position by the take up motor 10. The developing head 3b for the second color is then set at the developing position. The driving motor 8 then transports paper 4 in the forward direction for the second pass.

Referring to FIG. 11, a representative position of paper 4 during the second pass (dotted line) is shown with CCD line sensors 11a, 11b. The position of paper 4 during the first pass is represented by the solid lines. Paper 4 is shown at a position during the second pass where the leading edge of one of the registration marks 12 is sensed by left CCD line sensor 11a. The left and right edges of paper 4 are deviated by $\Delta x_1$ and $\Delta x_1'$ respectively from their positions during the first pass. The outputs of the CCD line sensors 11a, 11b amplified by the amplifier circuits 32, 33 for this condition are shown in FIGS. 12(c) and 12(e), respectively. FIGS. 12(b) and 12(d) show the equivalent amplified outputs of the CCD line sensors 11a, 11b stored during the first pass. FIG. 12(a) is the waveform of a reading period signal for the CCD line sensors 11a, 11b. The microcomputer 15 has stored the left and right edge position data position as the values $L_0$ and $R_0$. The left and right position data obtained on the second pass, the values $L_0'$ and $R_0'$, are compared by the microcomputer 15 with $L_0$ and $R_0$ by the calculations $(L_0 - L_0') = \Delta x_1$ and $(R_0 - R_0') = \Delta x_1'$. If $(L_0 - L_0'') = x_1$ is a positive value, the paper 4 has shifted toward the right during the second pass Otherwise if $(L_0 - L_0') = \Delta x_1$ is a negative value, paper 4 has shifted toward the left. Of course, if $L_0 = L_0'$, $\Delta x_1 = 0$ and paper 4 has not shifted at all. The amount that the edges of the paper 4 has shifted is calculated as:

$$\Delta x_1 = 14 \times L_0 - L_0' uM$$

$$0x'_1 = 14 \times R_0 - R_0' uM$$

because the light receiving elements of the CCD line sensors 11a, 11b are arrayed at a pitch of 14 μM.

The amount of expansion or shrinkage of the paper 4 perpendicular to the direction of transport is $L_0 + R_0) - (L_0' + R_0')$. A positive result signifies a shrinkage of the paper 4, a negative result signifies an expansion, and a zero signifies no expansion or shrinkage. Accordingly, the amount of the expansion or shrinkage is determined by the following equation:

$$[(L_0 + R_0) - (L_0' + R_0')] \times 14 \ uM = [(L_0 - L_0') +$$

-continued
$$(R_0 - R_0')] \times 14 \ uM = (\Delta x_1 + \Delta x_1') \times 14 \ uM$$

This calculation is made upon each detection of a registration mark 12 on each pass of paper 4 after the first pass, and a correction is made to the starting position of latent image formed by the recording head 2.

Each rewind operation after formation of each color image causes paper 4 to shift. In addition, errors in the measured values can also cause deviation in the superimposition of the different color images. To correct for these large deviations, the image recording does not start until five registration marks have been detected. The passage of these registration marks is used to correct the early deviation as shown in the flow chart of FIG. 13. The values $\Delta x_0$, $\Delta x_0'$, $\Delta x_1$, $\Delta x_1'$, $\Delta x_2$, $\Delta x_2'$, $\Delta x_3$, $\Delta x_3'$, $\Delta x_4$, and $\Delta x_4'$ representing the deviation of the left and right edges at the first five registration marks are stored in memory. When all this data has been collected it is compared with an upper limit value. Any value exceeding the upper limit is considered an error and discarded for the purposes of this operation. The remaining values are averaged for the left and right edges, and any values greatly deviating from this average are also discarded. Again, the remaining values are averaged giving the values and representing the average deviation of the left ($\overline{\Delta x}$) and right ($\overline{\Delta x'}$) edges respectively. Then, calculations for converting these average values into the number of picture elements are carried out by the following expressions:

$$a_0 = (\Delta x \times 14)/62.5 + 0.5 \quad (1)$$

$$b_0 = (\overline{\Delta x} + \overline{\Delta x'}) \times 14/62.5 + 0.5 \quad (2)$$

where the integral portion represents the number of picture elements. In equation (1), $a_0$ represents the number of picture elements that paper 4 has shifted. In equation (2), $b_0$ represents the number of picture elements of expansion or shrinkage of paper 4. Based on these corrections, when the fifth registration mark 12 is detected, the microcomputer 15 sets the initial value of the write address counter 23 through the latch circuit 21 in such a manner that the main scanning start position of the electrostatic recording head 2 is $(128 + a_0)$.

The correction for expansion or shrinkage is carried out by feeding the value $b_0$ from the microcomputer 15 to the expansion/shrinkage correction circuit 20 via the latch circuit 22. In the expansion/shrinkage correction circuit 20, first a decision is made as to whether the number of the picture elements in a line needs to be increased or decreased. As described below, the expansion/shrinkage correction circuit 20 uses data from a predetermined table corresponding to the number $b_0$ to increase or decrease the number of picture elements at predetermined positions in a line. Such numerical adjustment of the picture elements is executed as illustrated in FIGS. 14 and 15.

If paper 4 has expanded, a table for increasing the number of picture elements is used, as shown in FIG. 14. It is first determined, see FIG. 14(a), that a new $D_{EX}$th picture element is to be inserted between the $D_{n-1}$th and $D_n$th picture elements. Then it is necessary to decide whether the $D_{EX}$th picture element is to be a white picture element ("L" level) or colored picture element ("H" level). This decision is based upon whether the $D_{n-2}$th and $D_{n+1}$th picture elements, which surround the relevant $D_{n-1}$th and $D_n$th picture elements, are white ("L" level) or colored ("H" level). There are sixteen variations for these four elements and the result for $D_{EX}$ for each variation is shown in the table of FIG. 14(b).

When paper 4 has shrunk it is necessary to remove a picture element. The table used to determine how to remove a picture element is shown in FIG. 15. Two picture elements, the $D_n$th and $D_{n-1}$th elements, are replaced by a single $D_{SH}$th element (FIG. 15(a)). Similar to the method for increasing the number of picture elements, the decision of whether the new element, $D_{SH}$, is to be white or colored is based upon the status of the $D_n$th and $D_{n-1}$th elements and the surrounding $D_{n-2}$ and $D_{n+1}$ elements. This decision is made in accordance with the table shown in FIG. 15(b).

This method of reducing or increasing the number of picture elements in a line by comparing the changed element with the surrounding elements provides for better superimposition of the colors and reduced negative effects of expansion or shrinkage in paper 4. This method also provides for dispersing the change in the number of picture elements in a line across the entire line further reducing negative effects on the image.

The increase or decrease in the number of picture elements for the first line of the image is carried out in this manner based upon the calculated value $b_0$. The image signals thus changed by the expansion/shrinkage correction circuit are written to the line memory 26, shown in FIG. 3, in conformity with the write address counter 23. The main scanning start position is set to $128 + a_0$. The read address counter 24 reads the data from the line memory 26 and delivers it to the recording driver circuit 13 via the FIFO 27. Thus, the first picture image line is recorded by the electrostatic recording head 2 on paper 4. The left and right correction value $a_0$ and the expansion/shrinkage correction factor $b_0$ are stored in memory.

The correction for shifting of paper 4 in the direction perpendicular to its transport after the fifth registration mark has been detected is now explained by reference to the flow chart of FIG. 16. The left CCD line sensor 11a detects the sixth registration mark and the left edge position $L_6'$ which is supplied by the measuring circuit 28 to the microcomputer 15. The left edge position $L_6'$ is compared to the left edge position measured during the first pass $L_6$, and the difference $\Delta x_6 = (L_6 - L_6')$ is calculated. The amount of shifting of the paper $a_6$ is then calculated as $a_6 = [(\Delta x_6 \times 14)/62.5 + 0.5]$. Thus, the left/right correction data for producing image lines after the sixth registration mark $(128 + a_6)$ is obtained. The current left/right correction data has been set to $(128 + a_0)$ after detection of the 5th registration mark 12. The current left/right correction $(128 + a_0)$ is compared with the newly calculated value $(128 + a_6)$. If $a_0$ is greater than $a_6$, a counter is incremented. Other counters are incremented if $a_0$ is less than $a_6$ or $a_0$ is equal to $a_6$. At each registration mark, a new left/right correction, $a_n$, is calculated and compared to the then current left/right correction, $a_{n-1}$. The appropriate counter is incremented. When one counter reaches a predetermined value, e.g. six, a further correction is made. If the "greater than" counter reaches the predetermined value, the left/right correction is shifted to the right and set to $(128 + a_n + 1)$. If the "less than" counter is first to reach the predetermined value, the left/right is changed to the left and set at $(128 + a_n - 1)$. If the "equal to" counter reaches the predetermined value, the left/right correction is not changed. After one of the counters reaches the predetermined value, all the counters are set to zero and the process repeats.

The method for correcting for expansion or shrinkage of paper 4 after the fifth registration mark has been detected is shown in the flow chart of FIG. 17. On the second and subsequent passes, when the left CCD line sensor 11a detects the sixth registration mark, the left edge position $L_6'$ and right edge position $R_6'$ are supplied from the measuring circuit 28 to the microcomputer 15 as described above. The current left and right edge positions are compared with the corresponding left and right edge positions from the first pass, $L_6$, $R_6$. The differences $\Delta x_6 = (L_6 - L_6')$ and $x_6' = (R_6 - R_6')$ are calculated as well as the expansion/shrinkage correction:

$$b_6 = [(\Delta x_6 + \Delta x_6') \times 14/62.5 + 0.5]$$

The current expansion/shrinkage correction is $b_0$, set after detection of the fifth registration mark. The current correction $b_0$ is compared with the newly calculated value $b_6$. Like the left/right correction, one of three counters, "greater than," "less than," or "equal to," is incremented on the basis of this comparison. As each registration mark is detected, the expansion/shrinkage correction, $b_n$, is compared with the then current correction, $b_{n-1}$, and the appropriate counter is incremented. A further modification is made to the expansion/shrinkage correction when one of the counters reaches a predetermined value, e.g. six. When the "greater than" counter reaches the predetermined value, $b_n$ is increased by one and the three counters are set to zero. When the "less than" counter reaches the predetermined value, $b_n$ is decreased by one and the three counters are set to zero. When the "equal to" counter reaches the predetermined value, no change is made to the correction, and the three counters are set to zero. The modified expansion/shrinkage correction is fed to the expansion/shrinkage correction circuit 20 which modifies the picture image as described above. This process is repeated to insure a proper correction for the expansion or shrinkage of paper 4 in the direction perpendicular to its transport.

The corrections described herein are repeated for each of the subsequent passes of paper 4 through the apparatus 1 for recording of the cyan, magenta, and yellow images. If the black image is not recorded at the same time as the registration marks, the same correction can be used for the recording of the black image. The corrections are equally valid for five passes through the apparatus as for four passes.

Correction of expansion or shrinkage in the direction of transport of the electrostatic recording paper 4 must be performed simultaneously with the corrections described above. Three methods of carrying out this correction are described below. These lengthwise corrections are made by adjusting the step pulse period applied to motor 8 to drive paper 4 in the direction of arrow A shown in FIG. 1. By measuring the distances between successive registration marks 12, adjustments can be made to the speed of transport of paper 4 to provide for correct spacing of the image lines.

Paper 4 is moved through the apparatus 1 by drive motor 8 driven by step pulses such that one image line is recorded every step pulse period. The initial step pulse period is $t_0$. During the first pass of paper 4, registration marks 12 are recorded as latent images by the recording head 2 every 128 image lines. After the registration marks 12 have been developed, the left CCD line sensor 11a detects registration marks 12, and the distance between successive registration marks is measured in terms of the number of image lines between successive registration marks. All the measured distances are stored in memory.

FIGS. 18(a) and (d) show waveforms of mark detection signals having a predetermined period and synchronized with data for one image line. FIGS. 18(c) and (f) show waveforms of step pulse signals obtained from programmable timer 19. At the second and subsequent passes, step pulses of a period $t_o$ are fed from the programmable timer 19 to the pulse motor driver circuit 25 to transport paper 4 at a the same constant speed as at the first pass. As paper 4 begins to be transported on subsequent passes, the left CCD line sensor 11a detects the first registration mark 12, and the mark detection signal, shown in FIG. 18(a), is delivered from the mark detector circuit 38 to the microcomputer 15. The period from the first registration mark to the second registration mark is counted with reference to the number of image lines between the registration marks, while the programmable timer 19 outputs step pulses of the period $t_o$. Upon detection of the second registration mark, the measured value between registration marks, $N_1'$, is compared with the measured value between the first and second registration marks stored during the first pass, $N_1$, to determine the correction that must take place. If $N_1'$ is greater than $N_1$, then paper 4 has expanded and the step pulse period is reduced to be less than $t_o$. This will increase the speed of transport of paper 4 to provide for the recording of 128 image lines between the next registration marks. If $N_1'$ is less than $N_1$, then paper 4 has shrunk and the step pulse period is increased to be greater than $t_o$, decreasing the speed of paper 4. Of course, if the two values are equal, no correction is necessary. The correction to the step pulse period is made in accordance with the equation:

$$t_n = t_o (1 + \Delta N_n / 128) \quad (3)$$

where $\Delta N_n = N_n - N_n'$.

This correction is carried out for each registration mark up to and including the thirty-second. Each step pulse period, $t_n$, calculated using equation (3) is stored in memory. Beginning at the thirty-third registration mark, the new step pulse periods are calculated in accordance with this equation:

$$t_o = t_M (1 + \Delta N_n / 128) \quad (4)$$

where $t_M$ has the highest frequency among the previous thirty-two step pulse periods. The use of equation (4) eliminates the noise induced during the time of reading the registration marks to improve the superimposition of the color image.

FIG. 19 is a flow chart illustrating the process for carrying out this correction for expansion and shrinkage of paper 4 in the direction of its transport. In ST1, a decision is made as to whether paper 4 is on its first pass or a subsequent pass. On a first pass the distance between the registration marks 12 is measured and stored in memory (ST2). On subsequent passes, the distance between the registration marks is measured (ST3). The measured value on the subsequent pass is compared with the measured value at the first pass, and the amount of correction, $\Delta N_n$, is calculated (ST4). For the first thirty-two registration marks, the step pulse period $t_0$ used during the first pass is chosen as a reference value (ST5). For the thirty-third and later registration marks, the pulse period $t_M$ determined from the previous thirty-two step pulse periods is chosen as a reference value (ST6). The chosen reference value (from ST5 or ST6) and the difference obtained in ST4, $\Delta N_n$, are used in equation (3) or (4), to set the value of the step pulse period. This set value is stored in memory (ST8), and the step pulse period is adjusted to the new set value (ST9), thereby changing the transport speed of paper 4 to correct for its expansion or shrinkage of paper 4.

A second method for compensating for expansion or shrinkage of paper 4 in the direction of transport incorporates the same method for recording the registration marks 12 on paper 4 and measuring and storing the distance between registration marks as the first method described. Paper 4 is transported with step pulses of a period $t_0$, and registration marks 12 are recorded as latent images every 128 lines. The registration marks 12 are developed and then detected by the left CCD line sensor 11a. The distance between the registration marks 12 is stored in the memory.

During subsequent passes, paper 4 is initially transported at the step pulse period $t_0$ as the distance between the first and second registration marks is measured. This distance, measured in image lines, is compared with the measured value between the first and second registration marks determined during the first pass. The step pulse period controlling the transport of paper 4 is corrected based on the equation:

$$t_n = t_0 (1 + \Delta N_n / 128) \quad (5)$$

where $t_0$ is the step pulse period used during the first pass and $\Delta N_n$ is the difference between the distance between registration marks during the first pass and the second pass.

Furthermore, a decision is made as to whether the difference, $N_n$, is positive, negative, or zero. Three counters are provided which count the number of occurrences of positive, negative and zero differences The three counters are incremented accordingly until one counter reaches a predetermined total, e.g. six. If the zero counter is the first to reach the predetermined amount, the three counters are set to zero and no additional change is made to the step pulse period $t_n$. If the positive counter reaches the predetermined amount first, the step pulse period $t_n$ is decreased by a fixed amount such that the distance between registration marks is decreased by a fixed amount, e.g. ¼ or ⅛ image lines. Likewise, if the negative counter reaches the predetermined amount first, the step pulse period $t_n$ is increased by a fixed amount such that the distance between registration marks is increased by a fixed amount. Simultaneously with the adjustment to the step pulse period, the three counters are reset, and this adjustment process is repeated.

FIG. 20 is a flow chart illustrating this method for compensating for expansion or shrinkage of paper 4 is the direction of transport of paper 4. A decision is made as to whether paper 4 is on its first pass or a subsequent pass (ST1). On the first pass, the distance between the registration marks 12 is measured and stored in memory (ST2). On subsequent passes, the distance between the registration marks 12 is measured (ST3) and compared with the measured value obtained during the first pass. The amount of correction is thereby calculated (ST4). Equation (5) is used to calculate a new set value of the step pulse period (ST5), which is used to change the transport speed of paper 4 (ST6). The distance between the registration marks obtained in ST3 is compared with the distance between the registration marks during the first pass (ST7). When the latter is greater than the former, the positive counter is incremented (ST8); when the latter is less than the former, the negative counter is incremented (ST11); and when the two are equal, the zero counter is incremented (ST14). The incremented counter is then checked to determine if it has reached the predetermined amount (ST9, ST12, ST15). If the positive or negative counter has reached the predetermined amount, the step pulse period is incremented or decremented accordingly (ST10, ST13). If the zero counter reaches the predetermined amount the step pulse period is unchanged (ST15). All counters are then cleared (ST17).

A third method for compensating for expansion and shrinkage of paper 4 in the direction of transport of paper 4 will now be described. The operation of recording, measuring and storing the registration marks 12 during the first pass are the same as described for the other two methods. On subsequent passes, the step pulse period, $t_n$, which controls the transport speed of paper 4, is initially a function of the measured distance between registration marks during the first pass and the step pulse period during the first pass, $t_0$. Thus, an initial step pulse period $t_1$ is calculated to correct for any expansion or shrinkage created on the first pass:

$$t_1 = t_o [1 + (N_1 - 128)/128] \qquad (6)$$

where $N_1$ is the measured distance between the first and second registration marks during the first pass.

As paper 4 is transported through the apparatus on the second and subsequent passes the distance between registration marks, $N_n'$, is measured. This distance is used to correct the initial step pulse period $t_1$ to account for any changes occurring on the present pass. A new reference value, $t_1'$, is calculated to be used to correct the next step pulse period, $t_2$.

$$t_1 = t_1 [1 + (N_1 - N_1')/128] \qquad (7)$$

The step pulse period for the transport of the paper between the next set of registration marks is then calculated as:

$$t_2 = t_1 ][1 + [(N_2 - 128) - (N_1' - 128)]/128 \qquad (8)$$

where $N_2$ is the measured distance between the second and third registration marks during the first pass.

The step pulse period $t_2$ is a function of both the error in the measured distance between the registration marks during the first pass ($N_2 - 128$) and the error in the measured distance between the previous set of registration marks during the present pass ($N_1' - 128$). The measured distance between the second and third registration marks during the first pass, $N_2$, is then compared with the measured distance $N_2'$ during the present pass and used to calculate a reference step pulse period $t_2'$ as follows:

$$t_2' = t_2 [1 + (N_2 - N_2')/128] \qquad (9)$$

The step pulse periods $t_n$ for the remaining transport are calculated in the same manner. This method of correcting for expansion or shrinkage provides for the image to be formed with constant image line density despite the occurrence of expansion or shrinkage of paper 4 in the direction of transport.

The description of correction for expansion and shrinkage of paper 4 in the direction of transport has been limited to adjustments to the step pulse periods on passes subsequent to the first. A correction can also be made on the first pass. Paper 4 is transported by step pulses of period $t_0$ until the registration marks 12 are detected by the left CCD line sensor 11a. If there is any expansion or shrinkage of paper 4 between the formation of latent images by the recording head 2 and the detection of the registration marks 12, the distance between registration marks 12 detected by the CCD line sensor 11a will be different from the reference distance used for forming the registration marks. Therefore the step pulse period for transporting paper 4 is corrected as previously described. Thus, a correction can be executed also for the expansion or shrinkage of the electrostatic recording paper 4 caused at the first pass, hence recording the distance between the registration marks 12 in an exact length to consequently enhance the precision in both the image length and the positional coincidence of the individual colors in the final composite image.

The apparatus described above can correct for equal changes along the left and right edges of paper 4. It is also possible for paper 4 to undergo unequal changes along its edges causing a situation in which the paper is somewhat skewed. An apparatus 50 for correcting such a problem is shown in FIG. 21. The construction of this apparatus is identical to that described above except for a different control circuit 14'. FIG. 21 also depicts a second set or registration marks 47 along the right edge of paper 4. Generally, the color image recording apparatus 50 operates by detecting the left registration marks 12 and the right registration marks 47 and making a correction for skew based upon the time difference between the detection of the left and right registration marks.

Prior to beginning the image recording, the motor 9 for rotating the developing unit 3 is activated to move developing head 3a, supplied with a black liquid developing agent, to the developing position. Paper 4 is then transported at a constant speed by the transport roller 6, the pinch roller 7 and the driving motor 8 in the direction indicated by arrow A. As paper 4 passes through the recording apparatus 50, electrostatic latent images corresponding to the registration marks 12 are formed every 128 image lines along the left edge and registration marks 47 are formed along the right edge every 512 image lines by the recording head 2 energized from the recording driver circuit 13. In this manner there is one right registration mark for every four left registration marks 12. Such latent images are rendered visible by the developing head 3a. Thereafter the visualized left registration marks 12 reach the left CCD line sensor 11a and the right registration marks 47 reach the right CCD line sensor 11b. Simultaneously with the detection of the left registration marks 12 by the left CCD line sensor 11a, both CCD line sensors 11a, 11b detect the edges of paper 4. Data representing the position of the edges of paper 4 as detected by CCD line sensors 11a, 11b are stored in a memory. Such position data is stored for each registration mark 12. Upon detection of the fifth registration mark by the left CCD line sensor 11a, recording signals corresponding to the black image are fed from the recording driver circuit 13 to the recording head 2. The recording head 2 forms an electrostatic latent image corresponding to the black picture image on the electrostatic recording paper 4 The latent image is then rendered visible by the developing head 3a.

The operations of rewinding paper 4 and recording of the color images are identical to those described previously. The corrections for left/right expansion and shrinkage and lengthwise expansion or shrinkage, as well as shifting are the same as for the apparatus shown in FIG. 1 and described in detail above.

In the operation of apparatus 50, the first right registration mark 47 is formed at the same time as the first left registration mark 12. One right registration mark 47 is formed at the same time as every four left registration marks 12. Thus right registration marks 47 correspond to the 1st, 5th, 9th . . . left registration marks 12.

The results of the skewing on the image are shown in FIG. 22(a). A straight line 52 perpendicular to the length of paper 4 is shown. An image line 51 is coincident with the straight line 52 at the left edge of the image. From the left edge to the right edge the image line deviates until, at the right edge, the image line is displaced by the distance $\Delta 1$. By carrying out the correction of this invention, the greatest deviation of image line 51 from straight line 52 is controlled to be $\frac{1}{2}$. As illustrated in FIG. 22(b), this correction is carried out such that image line 53 is coincident with straight line 52 at the center of the image. In this manner, the deviation is distributed on both sides of the center of the image, thereby reducing the greatest amount of deviation to one half the uncorrected amount.

To correct for skewing, CCD line sensors 11a, 11b detect the left and right registration marks, respectively, in the same manner as color image recording apparatus 1. Upon detection of the registration marks 12, 47 the left and right CCD line sensors 11a, 11b send signals to the control circuit 14'. Control circuit 14' is similar to control circuit 14 described above, but the measuring circuit 48, shown in FIG. 23, of control circuit 14' has two mark detectors 38, 49 of the same construction. Thus, upon detection of a left and a right registration mark, the left mark detector circuit 38 and the right mark detector circuit 49 each send a mark detection signal to microcomputer 15. The measuring circuit 48 also performs the left and right edge detection function as described previously.

FIG. 24 (a) shows a train of left mark detection signals; FIG. 24 (b) shows a train of right mark detection signals; and FIG. 24 (c) shows a train of recording sync pulses output from the programmable timer 19 to the recording driver circuit 13. FIGS. 25(a) and 25(b) illustrate the relative positions of the left and right registration marks 12, 47 at times illustrated in FIGS. 24(a) and 24(b) as the skewed recording medium is transported through the image recorder. FIG. 26 is a flow chart of the operation procedure executed for correcting any transverse positional non-coincidence of color images derived from the oblique motion of recording paper 4.

When the paper is skewed during its passage, the registration marks are not detected by the CCD line sensors 11a, 11b at the same time. The first left registration mark 12 is first detected by left CCD line sensor 11a. Then the paper moves forward until the first right registration mark 47 is detected by right CCD line sensor 11b. The time interval between detection of the two registration marks is $\Delta t_1$ (see FIGS. 24(a),(b) and 25(a)). As the paper moves further, detection of the fifth left registration mark 12 occurs before detection of the second right registration mark 47. The time interval between detection of the fifth left and the second right registration marks is $\Delta t_2$ (see FIGS. 24(a),(b) and 25(b)). As the paper moves further, FIGS. 24(a) and (b) illustrate the case where the third right registration mark 47 is detected before the ninth left registration mark 12 and the time difference is $\Delta t_3$.

To correct for skew, the difference in time between the first left and right registration marks, $\Delta t_1$, is determined. Then a calculation is performed to determine a line value which represents the number of lines corresponding to such time difference. A correction value is then calculated from the above determined line value so that the image line recording is started from the central portion of the image between the left and right registration marks. The correction value thus calculated represents a multiple of $\frac{1}{4}$ line periods, or $t_0/4$.

Assume for the purpose of illustration that the correction value obtained is 3, and the 5th left registration mark 12 and the 2nd right registration mark 47 have been detected. A recording sync pulse of a given period $t_0$ is output after a delay time of $t_0/4$ from the time of the detection of left registration mark 12 or the right registration mark 47, whichever is detected earlier. After several image lines have been recorded, the timing of the output of the recording sync pulse is further delayed for a time corresponding to $t_0/4$. After several additional image lines are recorded, the timing of the output of the recording sync signal is again delayed by $t_0/4$. As a result, the total delay of the recording sync output timing between successive registration marks is $3t_0/4$. The correction value to be applied upon detection of a 9th left or 3rd right registration mark is determined from the time difference in detecting the 5th left registration mark 12 and the 2nd right registration mark 47, and a standby state is produced awaiting detection of the 9th left registration mark 12 and the 3rd right registration mark 47. Such operation is performed upon each detection of one right registration mark 47 and one of every four left registration mark 12.

The above correction will now be described in more detail with reference to the timing chart shown in FIG. 24. The 1st left registration mark 12 is detected as illustrated in FIG. 24 (a), and then the 1st right registration mark 47 of FIG. 24(b) is detected. The time difference $\Delta t_1$ between the detections is calculated by the microcomputer 15, and a further calculation is executed to find the ratio ($\Delta t_1/t_0$) of the time difference $\Delta t_1$ to the given period $t_0$ of the recording sync pulse. There is then executed another calculation to find a rounded integral multiple of the time $t_0/4$ based upon the ratio of the result of the preceding calculation. This result can be achieved by using the integral portion of the results of the following computation.

$$\{(4\ t/t_0^2) + 0.5\} \tag{10}$$

The calculated correction value, equal to the number of times correction is applied is thus obtained, and control for delaying the timing of the output of the recording sync pulse for a given period of time $t_0/4$ is carried out in each of such corrections. For example, when the 5th left registration mark 12 is detected (at the start of the image recording), as shown in FIG. 24 (c), output of the recording sync pulse of a given period $t_0$ is delayed by the time $t_0/4$. FIG. 27 illustrates the example where such time delay is performed three times separated by four recording sync pulses to cause a total delay of $3t_0/4$ during the interval between the 5th and 9th left registration mark 12 and the 2nd and 3rd right registration mark 47.

Referring to FIG. 24 again, the 5th left registration mark 12 is next detected and, after the lapse of $t_2$ therefrom, the 2nd right registration mark 47 is detected. Consequently, there exists the time difference $\Delta t_2$ between detection of these registration marks. Equation 10 is used to compute the correction value so that the number of times of required corrections is determined and a standby state is created awaiting detection of the 9th left registration mark 12 and the 3rd right registration mark 47. This calculated value will be used to correct the timing of the recording sync pulse between the 9th and 13th left registration mark 12 and the 3rd and 4th right registration mark 47. If the 3rd right registration mark 47 is detected earlier than the 9th left registration mark 12, as shown in FIG. 24 (b), the recording sync pulse is delayed for the time $t_0/4$. The operation is performed continuously until completion of the image recording and in this way correction is achieved at the center of the image by using the left and right registration marks. The correction for oblique paper motion executed during the first pass is repeated at any subsequent pass. By correcting the oblique motion, it is possible to attain the desired correction of the second-color and subsequent color images at the center thereof.

Accordingly, where no correction is executed with regard to the oblique motion there occurs, as illustrated in FIG. 22(a), a fault in that, although positional coincidence of superimposed images is attained properly in the vicinity of the left registration marks, a deviation $\Delta 1$ is caused by the oblique motion at positions on the opposite side. Meanwhile, where oblique motion is corrected to achieve a positional coincidence of the images at the center thereof in accordance with the invention, the deviation $\Delta 1$ caused by the oblique motion is distributed on the two sides of recording paper 4, whereby the deviation on each side is halved to be $\Delta \frac{1}{2}$, and consequently the positional discrepancy due to superimposition of the images is reduced. In an image of shorter length, a satisfactory result is achievable by execution of the above oblique-motion correction by beginning at the left registration mark 12. The same advantageous effect can also be ensured where the 1st left registration mark 12 is formed as a straight line 50 and is detected by both CCD line sensors. It is not necessary that line 50 be continuous with the central portion of the picture area. Furthermore, the shape of the right registration mark 47 need not be the same as that of the left registration mark 12, since the purpose of right registration mark 47 is to determine the time when right registration mark 47 passes CCD line sensor 11b. In addition, the pitches of such left and right marks can be changed.

In summary, according to this invention, the two longitudinal edges of the electrostatic recording paper are detected by edge detection means at the same time as the registration marks recorded previously at the first pass of the electrostatic recording paper are detected and the resultant detection data is stored in the memory. Thereafter, when the same registration marks are detected at a second or subsequent pass, the data obtained at this time is compared with the previously stored data obtained during the first pass, thereby detecting the amount of meandering motion of the electrostatic recording paper. Consequently, it becomes possible to achieve an exact positional coincidence of individual colors without inducing distortion of the image despite existence of positional or physical changes in the paper. Improper correction derived from a detection error is prevented by effecting correction in stages until the entire amount of the correction is completed.

To effect corrections, the number of lines recorded is counted to provide the measurement of the distance between the registration marks, and then the number of lines actually counted is compared with the number of lines preset at the time of initially recording the registration marks so as to detect the difference therebetween. Such difference is corrected when recording the image line between the next registration marks, so that it becomes possible to prevent accumulation of the errors resulting from the improper transport of the paper.

In addition, the time difference between detection of successive registration marks provided along the left and right edges of the recording paper is measured and such time difference is used to control the recording timing at the central portion of the picture area to correct for any oblique motion of the electrostatic recording paper, whereby the error in positioning each color image can be minimized despite occurrence of any oblique motion of the recording paper.

Still further, the reading region of the line image sensor is divided into a plurality of partial regions, and the edge of the electrostatic recording paper and the registration marks thereon are detected simultaneously from the signals obtained from the partial regions. Thus, only one sensing means along each longitudinal edge of the electrostatic recording paper is required. The invention provides an improved color image recording apparatus of improved image quality, simplified constitution, and lower production cost.

What has been described above is the presently preferred embodiment of the invention. Those skilled in the art will recognize that modification and changes to the foregoing can be made which come within the scope of the invention, which is specifically set forth in the appended claims.

What is claimed is:

1. A color image recording apparatus comprising:
   latent image forming means disposed in a transport path of a recording medium;
   energizing means for energizing said latent image forming means so as to form latent images on said recording medium;
   a plurality of developing means supplied with developing agents of mutually different colors to render visible the latent images formed on said recording medium by said latent image forming means;
   transport means for reciprocatively transporting said recording medium;
   control means for controlling said transport means in such a manner as to achieve a positional coincidence of said latent images in the transport direction of said recording medium at the time to form the latent images on said recording medium by said latent image forming means;
   correction means for correcting, in the direction orthogonal to the transport of said recording medium, for changes in the position and for the expansion or shrinkage of the recording medium; and
   detection means for detecting the transport state of said recording medium;
   wherein, during a first pass of said recording medium through said color recording apparatus, a series of registration marks are formed outside the effective area of said recording medium and along one or both longitudinal edges thereof;

in the process where said registration marks are formed, such marks are detected by said detection means while one or both longitudinal edges of said recording medium are detected simultaneously, and the information representing said registration marks and one or both longitudinal edges of said recording medium are stored as position data;

at each pass of said recording medium through said latent image forming means repeated by said transport means, latent images of individual colors are formed sequentially in the same area of said recording medium by the combination of said latent image forming means and said energizing means, and then are rendered visible by said developing means supplied with developing agents of the individual colors, and such process is repeated until completion of a composite color image where the images of the individual colors are superimposed on one another;

during a second or subsequent image recording operation, the detected position data of one or both edges of said recording medium is compared with said stored position data of one or both edges, and said correction means is controlled in accordance with the result of such comparison;

and simultaneously therewith, said control means is controlled on the basis of the position data obtained through detection of the registration marks by said detection means.

2. A color image recording apparatus according to claim 1, wherein position data relative to one or both edges of the recording medium is stored simultaneously with detection of the registration marks.

3. A color image recording apparatus according to claim 1, including means for comparing the position data obtained by said detection means during a second or subsequent image recording operation, with the position data stored initially at the time of recording the registration marks and means responsive to said comparing means for calculating an amount to be corrected by said correction means and an amount to be controlled by said control means.

4. A color image recording apparatus according to claim 1, wherein both edges of the recording medium are detected by said detection means, and the amount of expansion or shrinkage of the recording medium is calculated on the basis of the result of such detection, and a correction of such expansion or shrinkage is executed by increasing or decreasing the number of picture elements to be recorded.

5. A color image recording apparatus according to claim 4, wherein the state of the picture elements to be increased or decreased is determined with reference to the state of picture elements proximate to such picture elements.

6. A color image recording apparatus according to claim 1, wherein the distance between registration marks is measured by the use of pulses synchronized with the period to activate said energizing means, the difference between the measured value and the number of pulses preset initially at the time of recording said registration marks is calculated, and when a latent image between the next registration marks is recorded, the transport speed of the recording medium is controlled by said control means in accordance with the result of such calculation.

7. A color image recording apparatus comprising:

latent image forming means disposed in a transport path of a recording medium;

energizing means for energizing said latent image forming means so as to form latent images on said recording medium;

a plurality of developing means supplied with developing agents of mutually different colors to render visible the latent images formed on said recording medium by said latent image forming means;

transport means for reciprocatively transporting said recording medium;

control means for controlling said transport means in such a manner as to achieve a positional coincidence of said latent images in the transport direction of said recording medium at the time to form the latent images on said recording medium by said latent image forming means;

correction means for correcting, in the direction orthogonal to the transport of said recording medium, for changes in the position and for the expansion or shrinkage of the recording images; and a line image sensor for detecting the transport state of said recording medium;

wherein, during a first pass of said recording medium through said latent image forming means, a series of registration marks to be developed and rendered visible in one of the colors of said developing means are formed outside the effective area of said recording medium and along one or both longitudinal edges thereof;

in the process where said registration marks are formed, such marks are detected by said detection means while one or both longitudinal edges of said recording medium are detected simultaneously, and the information representing said registration marks and one or both longitudinal edges of said recording medium are stored as position data;

at each pass of said recording medium through said latent image forming means repeated by said transport means, latent images of individual colors are formed sequentially in the same area of said recording medium by the combination of said latent image forming means and said energizing means, and then are rendered visible by said developing means supplied with developing agents of the individual colors, and such process is repeated until completion of a composite color image where the images of the individual colors are superimposed on one another;

during an image recording operation, said correction means is controlled on the basis of the data obtained by detecting one or both edges of the recording medium by said line image sensor;

and simultaneously therewith, said control means is controlled on the basis of the data obtained through detection of the registration marks by said line image sensor.

8. A color image recording apparatus according to claim 7, wherein the output of said line image sensor is divided into a plurality of partial regions, and the amplification factor and the offset value of the output of said line image sensor are set in conformity with the signals obtained from such partial regions.

9. A color image recording apparatus according to claim 7, wherein the distance between mutually adjacent registration marks is measured by the use of timing pulses employed to activate said energizing means, and said transport means is so controlled that the distance between the registration marks is recorded with the same number of timing pulses.

10. A color image recording apparatus according to claim 7, wherein the output of said line image sensor is divided into a plurality of partial regions, and the edge of the recording medium and the registration marks are detected simultaneously on the basis of the signals obtained from such partial regions.

11. A color image recording apparatus comprising:
latent image forming means disposed in a transport path of a recording medium;
energizing means for energizing said latent image forming means so as to form latent images on said recording medium;
a plurality of developing means supplied with developing agents of mutually different colors to render visible the latent images formed on said recording medium by said latent image forming means;
transport means for reciprocatively transporting said recording medium;
timing control means for controlling said energizing means at the time to form the latent images on said recording medium by said latent image forming means; and
a plurality of detection means disposed proximate both edges of said recording medium;
wherein marks are formed on said recording medium by said latent image forming means and said developing means to be used for detection of the transport timings of said recording medium;
at each pass of said recording medium through said latent image forming means, latent images of individual colors are formed sequentially in the same area of said recording medium by the combination of said latent image forming means and said energizing means, and then are rendered visible by said developing means supplied with developing agents of the individual colors, and such process is repeated until completion of a composite color image where the images of the individual colors are superimposed on one another;
during the first pass of the recording medium through said recording apparatus said marks are detected by said plurality of detection means and the time difference between marks stored in memory;
during each subsequent pass of the recording medium through said recording apparatus said marks are detected by said plurality of detection means and the time difference between marks compared with the time difference between marks stored during the first pass, and the transport speed of said recording medium adjusted dependent upon detection of said marks;
wherein said timing control means is corrected upon each detection of the marks by an amount corresponding to one half of the transport timing difference relative to both edges of the recording medium.

12. A color image recording apparatus comprising:
latent image forming means disposed in a transport path of a recording medium;
energizing means for energizing said latent image forming means so as to form latent images on said recording medium;
a plurality of developing means supplied with developing agents of mutually different colors to render visible the latent images formed on said recording medium by said latent image forming means;
transport means for reciprocatively transporting said recording medium;
control means for controlling said transport means in such a manner as to achieve positional coincidence of said latent images in the transport direction of said recording medium; and
detection means for detecting the transport state of said recording medium;
wherein, at a first pass of said recording medium through said latent image forming means, a series of registration marks in one of the colors of said developing means are formed outside the effective area of said recording medium and along one or both longitudinal edges;
said registration marks being detected by said detection means and positional data of said marks in the transport direction of said recording medium stored in memory;
at each pass of said recording medium through said apparatus under the control of said transport means, latent images of individual colors are formed sequentially in the same area of said recording medium by the combination of said latent image forming means and said energizing means, and then are rendered visible by said developing means supplied with developing agents of the individual colors, such process being repeated until completion of a composite color image where the images of the individual colors are superimposed on one another;
during a second or subsequent image recording operation, positional data of the registration marks detected during the image recording operation is compared with said stored positional data, and desired speed data of said transport means at the image recording time is calculated on the basis of the result of such comparison and the data representative of the transport speed of said recording medium at the time of forming said registration marks, said control means being controlled in accordance with such speed data;
said speed data being calculated upon each detection of said registration marks and stored, and after storage of a predetermined number of said speed data, new speed data being calculated based on the highest frequency speed data among the entire stored speed data and the result of comparison of said positional data and said control means being controlled thereafter in accordance with the new speed data.

13. A color image recording apparatus according to claim 12, wherein, when a plurality of highest-frequency speed data exists and one of such data is selectively used.

14. A color image recording apparatus comprising:
latent image forming means disposed in a transport path of a recording medium;
energizing means for energizing said latent image forming means so as to form latent images on said recording medium;
a plurality of developing means supplied with developing agents of mutually different colors to render visible the latent images formed on said recording medium by said latent image forming means;
transport means for reciprocatively transporting said recording medium;
control means having first, second and third counter means and, when forming latent images on said recording medium by said latent image forming means, serving to control said transport means in such a manner as to achieve a positional coincidence of said latent images in the transport direction of said recording medium in conformity with the counted values of said first, second and third counter means; and detection means for detecting the transport state of said recording medium;

wherein, at a first pass of said recording medium through said apparatus, a series of registration marks to be developed and rendered visible in one of the colors of said developing means are formed outside the effective area of said recording medium and along one or both longitudinal edges;

said registration marks being detected by said detection means during the first pass of said recording means through said apparatus, and positional data of said marks in the transport direction of said recording medium is stored in memory;

at each pass of said recording medium through said apparatus, latent images of individual colors are formed sequentially in the same area of said recording medium by the combination of said latent image forming means and said energizing means, and then are rendered visible by said developing means supplied with developing agents of the individual colors, and such process is repeated until completion of a composite color image where the images of the individual colors are superimposed on one another;

during a second or subsequent image recording operation, the positional data of the registration marks detected during image recording time is compared with said stored positional data, and desired speed data of said transport means at the image recording time is calculated on the basis of the result of such comparison and the data representative of the transport speed of said recording medium at the time of forming said registration marks, said control means being controlled in accordance with such speed data;

said first, second or third counter means being incremented or decremented by a predetermined value depending on whether the detected positional data obtained as the result of said comparison is greater than, equal to, or smaller than the stored positional data, respectively;

said speed data being increased or decreased when the counted value of either said first counter means or said third counter means has reached a predetermined value;

the speed data being changed based upon said increased or decreased speed data and the result of comparison of said positional data, and said control means being thereafter controlled in accordance with the changed speed data; and the counter means being initialized when any one of said first, second and third counter means has counted said predetermined value.

15. A color image recording apparatus comprising:

latent image forming means disposed in a transport path of a recording medium;

energizing means for energizing said latent image forming means so as to form latent images on said recording medium;

a plurality of developing means supplied with developing agents of mutually different colors to render visible the latent images formed on said recording medium by said latent image forming means;

transport means for reciprocatively transporting said recording medium;

control means for controlling said transport means in such a manner as to achieve a positional coincidence of said images in the transport direction of said recording medium; and detection means for detecting the transport state of said recording medium;

wherein, at a first pass of said recording medium through said apparatus, a series of registration marks to be developed and rendered visible in one of the colors of said developing means are formed outside the effective area of said recording medium and along one or both longitudinal edges;

said registration marks being detected by said detection means during said first pass, and the positional data of said marks in the transport direction of said recording medium being stored in memory;

during passes of said recording medium through said apparatus, latent images of individual colors are formed sequentially in the same area of said recording medium by the combination of said latent image forming means and said energizing means, and then are rendered visible by said developing means supplied with developing agents of the individual colors, such process being repeated until completion of a composite color image where the images of the individual colors are superimposed on one another;

during a second or subsequent image recording operation, the stored position data $N_n$ (where n=1, 2, 3) of the nth registration mark is compared with the positional data $N_n$ (where n=1, 2, 3) of the nth registration mark detected during the first pass, and renewed transport speed data (n+1) calculated based on the result of such comparison and the transport speed data $t_n$ of said recording medium at the time of detection of the nth registration mark; and the position data N(n+1) (where n=1, 2, 3) of the (n+1)th registration mark is compared with the position data $N_n$ (where n=1, 2, 3) of the detected nth registration mark, and said control means is controlled in accordance with the value determined by calculating the result of such comparison and said renewed transport speed data (n+1).

* * * * *